(12) United States Patent
Mitobe et al.

(10) Patent No.: US 12,393,045 B2
(45) Date of Patent: Aug. 19, 2025

(54) OPTICAL ELEMENT AND IMAGE DISPLAY APPARATUS

(71) Applicant: FUJIFILM Corporation, Tokyo (JP)

(72) Inventors: Fumitake Mitobe, Minamiashigara (JP); Katsumi Sasata, Minamiashigara (JP); Hiroshi Sato, Minamiashigara (JP); Akiko Watano, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 485 days.

(21) Appl. No.: 18/065,044

(22) Filed: Dec. 13, 2022

(65) Prior Publication Data

US 2023/0288719 A1    Sep. 14, 2023

Related U.S. Application Data

(63) Continuation of application No. PCT/JP2021/022616, filed on Jun. 15, 2021.

(30) Foreign Application Priority Data

Jun. 19, 2020  (JP) ................. 2020-106014

(51) Int. Cl.
*G02B 27/42* (2006.01)
*F21V 8/00* (2006.01)
*G02B 27/01* (2006.01)

(52) U.S. Cl.
CPC ....... *G02B 27/4272* (2013.01); *G02B 6/0016* (2013.01); *G02B 27/0172* (2013.01); *G02B 2027/0178* (2013.01)

(58) Field of Classification Search
CPC ............ G02B 27/4272; G02B 6/0016; G02B 27/0172; G02B 2027/0178
See application file for complete search history.

(56) References Cited

U.S. PATENT DOCUMENTS

2018/0113309 A1* 4/2018 Robbins ............... H04N 13/337
2020/0326579 A1   10/2020 Sato et al.
(Continued)

FOREIGN PATENT DOCUMENTS

WO   WO 2017/180403 A1   10/2017
WO   WO 2019/131966 A1   7/2019
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2021/022616, dated Dec. 29, 2022.
(Continued)

*Primary Examiner* — Nathanael R Briggs
(74) *Attorney, Agent, or Firm* — Birch, Stewart, Kolasch & Birch, LLP

(57) ABSTRACT

An optical element includes a light guide plate, an incidence portion, and an emission portion, in which the incidence/emission portion includes an $\Lambda 1$ diffraction element having a diffraction period $\Lambda 1$, an $\Lambda 2$ diffraction element having a diffraction period $\Lambda 2$, and an $\Lambda 3$ diffraction element having a diffraction period $\Lambda 3$, "$\Lambda 1:\Lambda 2:\Lambda 3 = 1:1\sqrt{2}\pm 0.015:1/2\pm 0.015$" is satisfied, an angle between periodic directions of the $\Lambda 1$ diffraction element and the $\Lambda 2$ diffraction element and an angle between periodic directions of the $\Lambda 2$ diffraction element and the $\Lambda 3$ diffraction element is 45° or 135° (±0.5°), and an angle between the periodic directions of the $\Lambda 2$ diffraction elements in the incidence portion and the emission portion is any one of 0°, 90°, 180°, or 270° (±0.5°).

8 Claims, 11 Drawing Sheets

(56) References Cited

U.S. PATENT DOCUMENTS

| | | |
|---|---|---|
| 2021/0011295 A1 | 1/2021 | Sato et al. |
| 2021/0026049 A1 | 1/2021 | Saitoh et al. |
| 2021/0223448 A1 | 7/2021 | Sato et al. |
| 2021/0311259 A1 | 10/2021 | Sato et al. |

FOREIGN PATENT DOCUMENTS

| | | |
|---|---|---|
| WO | WO 2018/189852 A1 | 10/2019 |
| WO | WO 2019/189586 A1 | 10/2019 |
| WO | WO 2020/075738 A1 | 4/2020 |
| WO | WO 2020/122128 A1 | 6/2020 |

OTHER PUBLICATIONS

International Search Report (Form PCT/ISA/210) for International Application No. PCT/JP2021/022616, dated Sep. 7, 2021, with English translation.

Kress et al., "Towards the Ultimate Mixed Reality Experience: HoloLens Display Architecture Choices," SID 2017 Digest, 2017, pp. 127-131.

\* cited by examiner

OPTICAL ELEMENT AND IMAGE DISPLAY APPARATUS

CROSS-REFERENCE TO RELATED APPLICATIONS

This application is a Continuation of PCT International Application No. PCT/JP2021/022616 filed on Jun. 15, 2021, which claims priority under 35 U.S.C § 119(a) to Japanese Patent Application No. 2020-106014 filed on Jun. 19, 2020. Each of the above application(s) is hereby expressly incorporated by reference, in its entirety, into the present application.

BACKGROUND OF THE INVENTION

1. Field of the Invention

The present invention relates to an optical element in which light is incident, propagates, and is emitted and an image display apparatus including the optical element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that a virtual image is displayed to be superimposed on a scene that a user is actually seeing.

In AR glasses, light (projection light) projected from a display is diffracted (refracted) using a diffraction element to be incident into one end part of a light guide plate. As a result, the light is introduced into the light guide plate at an angle such that the light is totally reflected and propagates in the light guide plate. The light propagating in the light guide plate is also diffracted by the diffraction element in the other end part of the light guide plate and is emitted from the light guide plate to an observation position by the user.

Here, in the AR glasses disclosed in Bernard C. Kress et al., Towards the Ultimate Mixed Reality Experience: HoloLens Display Architecture Choices, SID 2017 DIGEST, pp. 127-131, in a case where a full color image consisting of light components of three colors including red, green, and blue is displayed, three light guide plates including a light guide plate for a blue image, a light guide plate for a green image, and a light guide plate for a red image are used.

However, in a case where the number of the light guide plates increases, the size of AR glasses increases, and the weight thereof also increases. Therefore, it is preferable that the number of light guide plates used in AR glasses is small, and AR glasses including one light guide plate is desired.

On the other hand, WO2017/180403A describes AR glasses where an image consisting of light components of three colors including red, green, and blue is emitted from a display, and each of the light components is diffracted by an incidence diffraction element to be incident into one light guide plate, propagates in the light guide plate, and is emitted from the light guide plate to an observation position of a user by an emission diffraction element such that the images of the three light components are superimposed on each other and are displayed. As a result, a color image can be displayed.

SUMMARY OF THE INVENTION

For the AR glasses, it is required that an image in a wide region of a display screen of a display can be observed without a user changing a visual line, that is, a field of view (FOV) is wide.

Accordingly, in the AR glasses described in WO2017/180403A, light that is incident from the incidence diffraction element and propagates in the light guide plate is further diffracted by an intermediate diffraction element, propagates in the light guide plate, and is emitted by the emission diffraction element.

In the AR glasses described in WO2017/180403A, an emission region of light from the emission diffraction element is expanded to expand the FOV.

In addition, for AR glasses, it is required that the FOV is wide and an appropriate image can be observed without occurrence of blurring, double images, color shift, and the like in the image, that is, an appropriate image can be observed without occurrence of so-called crosstalk.

However, in AR glasses including one light guide plate, crosstalk is likely to occur. In addition, as the FOV is wider, crosstalk is more likely to occur. Therefore, AR glasses where a wide FOV is realized using one light guide plate while suppressing crosstalk are desired to appear.

An object of the present invention is to solve the above-described problem of the related art and to provide an optical element that is used for AR glasses or the like and where a wider FOV can be realized using one light guide plate while suppressing crosstalk, and an image display apparatus including the optical element.

In order to achieve the object, the present invention has the following configurations.

[1] An optical element comprising:
a light guide plate;
an incidence portion that causes light to be incident into the light guide plate; and
an emission portion that emits light from the light guide plate,
wherein the incidence portion includes 6 or more diffraction elements,
the emission portion includes 8 or more diffraction elements,
each of the incidence portion and the emission portion includes, as the diffraction elements, a $\Lambda 1$ diffraction element where a period in a diffraction structure is $\Lambda 1$, a $\Lambda 2$ diffraction element where a period in a diffraction structure is $\Lambda 2$, and a $\Lambda 3$ diffraction element where a period in a diffraction structure is $\Lambda 3$,
the diffraction period $\Lambda 1$, the diffraction period $\Lambda 2$, and the diffraction period $\Lambda 3$ satisfy a relationship of "$\Lambda 1:\Lambda 2:\Lambda 3=1:1/\sqrt{2}\pm 0.015:1/2\pm 0.015$",
an angle between a periodic direction of the diffraction structure of the $\Lambda 1$ diffraction element and a periodic direction of the diffraction structure of the $\Lambda 2$ diffraction element and an angle between a periodic direction of the diffraction structure of the $\Lambda 2$ diffraction element and a periodic direction of the diffraction structure of the Λ3 diffraction element are 45°±0.5° or 135°±0.5°, and an angle between the periodic direction in the diffraction structure of the Λ2 diffraction element provided in the incidence portion and the periodic direction in the diffraction structure of the Λ2 diffraction element provided in the emission portion is any one of 0° 0.5°, 90°±0.5°, 180°±0.5°, or 270°±0.5°.

[2] The optical element according to [1],
in which the diffraction element includes a liquid crystal diffraction layer that is formed of a composition including a liquid crystal compound,
the liquid crystal diffraction layer has a liquid crystal alignment pattern where a direction in which a direction of an optical axis derived from the liquid crystal compound changes while continuously rotating is in at least one in-plane direction,
in the liquid crystal alignment pattern, the direction in which the direction of the optical axis derived from the liquid crystal compound changes while continuously rotating in the at least one in-plane direction is the periodic direction in the diffraction structure of the diffraction element, and
a length over which the direction of the optical axis derived from the liquid crystal compound rotates by 180° in the periodic direction of the diffraction structure is the period in the diffraction structure of the diffraction element.

[3] The optical element according to [2],
in which the liquid crystal diffraction layer is a cholesteric liquid crystal layer obtained by immobilizing a cholesteric liquid crystalline phase.

[4] The optical element according to any one of [1] to [3],
in which the optical element includes a plurality of the Λ1 diffraction elements, and
the incidence portion and the emission portion include a combination of the Λ1 diffraction elements where an angle between the periodic directions in the diffraction structures is 180°±0.5°.

[5] The optical element according to any one of [1] to [4],
in which the incidence portion and the emission portion include a plurality of the Λ3 diffraction elements, and
the incidence portion and the emission portion include a combination of the Λ3 diffraction elements where an angle between the periodic directions in the diffraction structures is 180°±0.5°.

[6] The optical element according to any one of [1] to [5],
in which the incidence portion and the emission portion include a plurality of the Λ2 diffraction elements, and
the incidence portion and the emission portion include a combination of the Λ2 diffraction elements where an angle between the periodic directions in the diffraction structures is 90°±0.5°.

[7] The optical element according to [6],
in which in a case where the periodic direction in the diffraction structure of one of the Λ2 diffraction elements is 0°,
the emission portion includes, in addition to the Λ2 diffraction element where the periodic direction in the diffraction structure is 0°, the Λ2 diffraction element where the periodic direction in the diffraction structure is 90°±0.5°, the Λ2 diffraction element where the periodic direction in the diffraction structure is 180°±0.5°, and the Λ2 diffraction element where the periodic direction in the diffraction structure is 270°±0.5°.

[8] An image display apparatus comprising:
the optical element according to any one of [1] to [7]; and
a display element that emits an image to the incidence portion of the optical element.

According to an aspect of the present invention, for example, in AR glasses or the like, crosstalk can be prevented and an image having a wide FOV can be displayed using one light guide plate.

DESCRIPTION OF THE PREFERRED EMBODIMENTS

Hereinafter, an optical element and an image display apparatus according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

Figure 1:
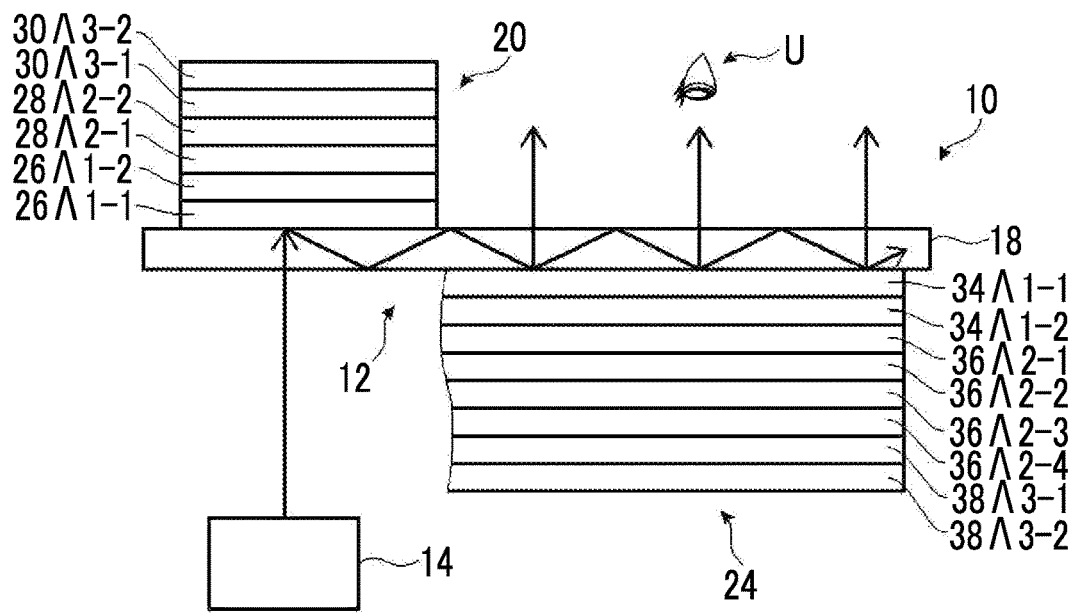
FIG. 1 is a diagram conceptually showing an example of an image display apparatus according to the present invention including an optical element according to the present invention.

FIG. 1 conceptually shows an example of the optical element and the image display apparatus according to the embodiment of the present invention.

Figure 2:
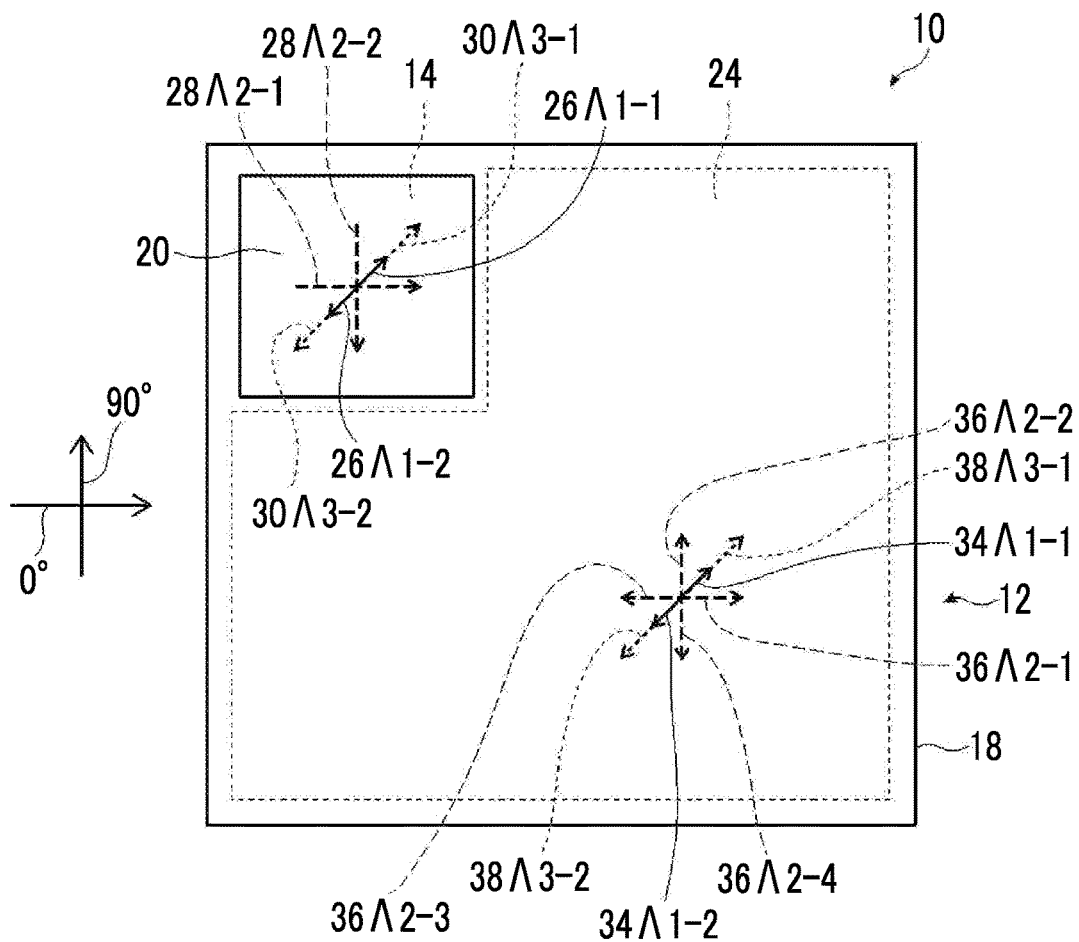
FIG. 2 is a diagram conceptually showing a plane of the optical element shown in FIG. 1.

FIG. 2 conceptually shows a plan view of the image display apparatus shown in FIG. 1. FIG. 2 is a diagram showing the image display apparatus (optical element) shown in FIG. 1 in a case where the optical element is seen from an observation direction of an image by a user U shown in FIG. 1.

As shown in FIGS. 1 and 2, an image display apparatus 10 includes an optical element 12 and a display 14. The optical element 12 includes: a light guide plate 18; an incidence portion 20 that includes incidence elements as diffraction elements; and an emission portion 24 that includes emission elements as diffraction elements.

In the optical element 12 in the example shown in the drawing, the incidence portion 20 has a rectangular planar shape and is provided in the vicinity of one corner portion of a main surface of the rectangular light guide plate 18. The emission portion 24 is provided on another main surface of the light guide plate 18 to cover the entire surface of a region of the light guide plate 18 other than the incidence portion 20 in a plane direction. That is, the emission portion 24 has a rectangular planar shape where one corner portion is cut out in a rectangular shape.

The main surface is the maximum surface of a sheet-shaped material (a plate-shaped material, a film, or a layer).

The planar shape is a shape in a case where each of the members is seen from the observation direction of the user U, and is a shape of main surfaces of the light guide plate 18, the incidence portion 20 (incidence element), and the emission portion 24 (emission elements) in the optical element 12.

As shown in FIG. 1, in the image display apparatus 10 shown in the example shown in the drawing, light that carries and supports an image displayed (emitted) by a display 14 is diffracted and reflected by the incidence portion 20 to be incident into the light guide plate 18 at an angle where total reflection can occur. The light incident into the light guide plate 18 propagates in the light guide plate 18 while repeating total reflection and is incident into the emission portion 24. The emission portion 24 diffracts and reflects the incident light to emit the light from the light guide plate 18 to an observation position by the user U.

In the optical element 12 in the example shown in the drawing, the incidence portion 20 includes an incidence element 26Λ1-1, an incidence element 26Λ1-2, an incidence element 28Λ2-1, an incidence element 28Λ2-2, an incidence element 30Λ3-1, and an incidence element 30Λ3-2 in this order from the light guide plate 18 side.

The incidence element 26Λ1-1 and the incidence element 26Λ1-2 are the Λ1 diffraction elements according to the embodiment of the present invention, in which a period in a diffraction structure (periodic structure of the diffraction element) is Λ1. The incidence element 28Λ2-1 and the incidence element 28Λ2-2 are the Λ2 diffraction elements according to the embodiment of the present invention, in which a period in a diffraction structure is Λ2. Further, the incidence element 30Λ3-1 and the incidence element 30Λ3-2 are the Λ3 diffraction elements according to the embodiment of the present invention, in which a period in a diffraction structure is Λ3.

In the optical element according to the embodiment of the present invention, the lamination order of the Λ1 diffraction elements, the Λ2 diffraction elements, and the Λ3 diffraction elements are not particularly limited, and various lamination orders other than that shown in the drawing can be used. That is, in the optical element according to the embodiment of the present invention, for example, the lamination order of the diffraction elements may be the order of the Λ3 diffraction elements, the Λ2 diffraction elements, and the Λ1 diffraction elements from the light guide plate 18 side or may be the order of the Λ2 diffraction elements, the Λ3 diffraction elements, and the Λ1 diffraction elements from the light guide plate 18 side.

In the optical element 12 in the example shown in the drawing, the emission portion 24 includes an emission element 34Λ1-1, an emission element 34Λ1-2, an emission element 36Λ2-1, an emission element 36Λ2-2, an emission element 36Λ2-3, an emission element 36Λ2-4, an emission element 38Λ3-1, and an emission element 38Λ3-2 in this order from the light guide plate 18.

The emission element 34Λ1-1 and the emission element 34Λ1-2 are the Λ1 diffraction elements according to the embodiment of the present invention, in which a period in a diffraction structure is Λ1. The emission element 36Λ2-1, the emission element 36Λ2-2, the emission element 36Λ2-3, and the emission element 36Λ2-4 are the Λ2 diffraction elements according to the embodiment of the present invention, in which a period in a diffraction structure is Λ2. Further, the emission element 38Λ3-1 and the emission element 38Λ3-2 are the Λ3 diffraction elements according to the embodiment of the present invention, in which a period in a diffraction structure is Λ3.

Although described below, in the optical element 12 according to the embodiment of the present invention, the period Λ1, the period Λ2, and the period Λ3 in the diffraction structures of the diffraction elements satisfy a relationship of "Λ1:Λ2:Λ3=1:1/√2±0.015:1/2±0.015".

In the example shown in the drawing, in a preferable aspect, the incidence element and the emission element include a liquid crystal diffraction layer and are reflective liquid crystal diffraction elements including a cholesteric liquid crystal layer as the liquid crystal diffraction layer.

Here, the image display apparatus including the optical element 12 according to the embodiment of the present invention may display a color image or a monochrome image.

In a case where the image display apparatus including the optical element 12 displays a monochrome image, each of the incidence element and the emission element includes a liquid crystal diffraction layer that selectively reflects light in a wavelength range of the corresponding color.

On the other hand, in a case where the image display apparatus including the optical element 12 displays a color image, each of the incidence portion 20 and the emission portion 24 may reflect blue light, green light, and red light using one liquid crystal diffraction layer (diffraction element), may include a liquid crystal diffraction layer corresponding to each of blue light, green light, and red light, and may include a liquid crystal diffraction layer corresponding to two colors of blue light, green light, and red light and a liquid crystal diffraction layer corresponding to the remaining color.

Alternatively, in a case where the image display apparatus including the optical element 12 displays a color image, the image display apparatus may include an incidence portion and an emission portion for blue light, an incidence portion and an emission portion for green light, and an incidence portion and an emission portion for red light, or may include an incidence portion and an emission portion corresponding to two colors of blue light, green light, and red light and an incidence portion and an emission portion corresponding to the remaining color. In a case where the optical element 12 includes a plurality of incidence portions and a plurality of emission portions, the incidence portions and the emission portions may be disposed and laminated or may be disposed at different positions in a plane direction of the light guide plate 18.

In the optical element 12, the members that are laminated are optionally bonded to each other using an adhesive layer.

As long as it has a sufficient light-transmitting property, the adhesive layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the adhesive layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the members using the adhesive layer, the members may be held using a frame, a jig, or the like to form the optical element according to the embodiment of the present invention.

The image display apparatus including the optical element 12 according to the embodiment of the present invention may display a color image or a monochrome image.

In a case where a color image is displayed, the diffraction elements in the incidence portion 20 and the emission portion 24 reflect blue light, green light, and red light.

Hereinafter, the components forming the optical element and the image display apparatus according to the embodiment of the present invention will be described.

[Display (Display Element)]

In the image display apparatus according to the embodiment of the present invention, the display 14 is not particularly limited. For example, various well-known displays used in AR glasses or the like can be used.

Examples of the display include a liquid crystal display, an organic electroluminescent display, and a scanning type display employing a digital light processing (DLP) type projector or Micro Electro Mechanical Systems (MEMS) mirror. Examples of the liquid crystal display include a liquid crystal on silicon (LCOS).

The display may display a color image or may display a monochrome image. In addition, in a case where the display device displays a color image, the display device may include three displays corresponding to a blue image, a green image, and a red image, respectively.

In the image display apparatus according to the embodiment of the present invention, optionally, a well-known projection lens used in AR glasses or the like may be provided between the display 14 and the light guide plate (incidence portion).

Here, in the image display apparatus according to the embodiment of the present invention, light to be emitted from the display 14 is not limited and is preferably unpolarized light (natural light) or circularly polarized light.

Optionally, depending on the polarization of light to be emitted from the display, a circularly polarizing plate consisting of a linear polarizer and a λ/4 plate, a λ/4 plate, or the like may be provided between the display 14 and the light guide plate 18.

[Light Guide Plate]

The light guide plate 18 is a well-known light guide plate that reflects light incident thereinto and propagates (guides) the reflected light. In the example shown in the drawing, the light guide plate 18 has a rectangular planar shape.

As the light guide plate 18, various well-known light guide plates used for a backlight unit or the like of AR glasses or a liquid crystal display can be used without any particular limitation.

The refractive index of the light guide plate 18 is not particularly limited and is preferably high. Specifically, the refractive index of the light guide plate 18 is preferably 1.7 to 2.0 and more preferably 1.8 to 2.0. By adjusting the refractive index of the light guide plate 18 to be 1.7 to 2.0, an angle range where light can be totally reflected and propagate in the light guide plate 18 can be widened.

[Incidence Portion and Emission Portion]

In the optical element 12 (image display apparatus 10) in the example shown in the drawing, the incidence portion 20 has a rectangular planar shape and is provided in the vicinity of one corner portion of one main surface of the rectangular light guide plate 18. On the other hand, the emission portion 24 is provided on another main surface of the light guide plate 18 to cover the entire surface of a region of the light guide plate 18 other than the incidence portion 20 in a plane direction. That is, the emission portion 24 has a rectangular planar shape where one corner portion is cut out in a rectangular shape.

As described above, the incidence portion 20 includes the incidence element 26Λ1-1, the incidence element 26Λ1-2, the incidence element 28Λ2-1, the incidence element 28Λ2-2, the incidence element 30Λ3-1, and the incidence element 30Λ3-2. In addition, the emission portion 24 includes the emission element 34Λ1-1, the emission element 34Λ1-2, the emission element 36Λ2-1, the emission element 36Λ2-2, the emission element 36Λ2-3, the emission element 36Λ2-4, the emission element 38Λ3-1, and the emission element 38Λ3-2.

Both of the incidence element and the emission element are reflective polarization diffraction elements. Specifically, both of the incidence element and the emission element are liquid crystal diffraction elements, include a cholesteric liquid crystal layer as a liquid crystal diffraction layer that acts as a diffraction element, and selectively reflect right circularly polarized light or left circularly polarized light.

Here, the incidence element 26Λ1-1, the incidence element 26Λ1-2, the incidence element 28Λ2-1, the incidence element 28Λ2-2, the incidence element 30Λ3-1, and the incidence element 30Λ3-2 of the incidence portion 20 and the emission element 34Λ1-1, the emission element 34Λ1-2, the emission element 36Λ2-1, the emission element 36Λ2-2, the emission element 36Λ2-3, the emission element 36Λ2-4, the emission element 38Λ3-1, and the emission element 38A3-2 of the emission portion 24 basically have the same configuration, except that the incidence portion 20 and the emission portion 24 are different, the periods of the diffraction structures in the diffraction elements described below are different, and/or periodic directions of the diffraction structures in the diffraction elements described below are different.

Accordingly, in the following description, in a case where each of the incidence elements and each of the emission elements do not need to be distinguished from each other, these diffraction elements will also be collectively referred to as "liquid crystal diffraction element".

(Liquid Crystal Diffraction Element)

The liquid crystal diffraction element will be described using FIGS. 3 to 5.

Figure 3:
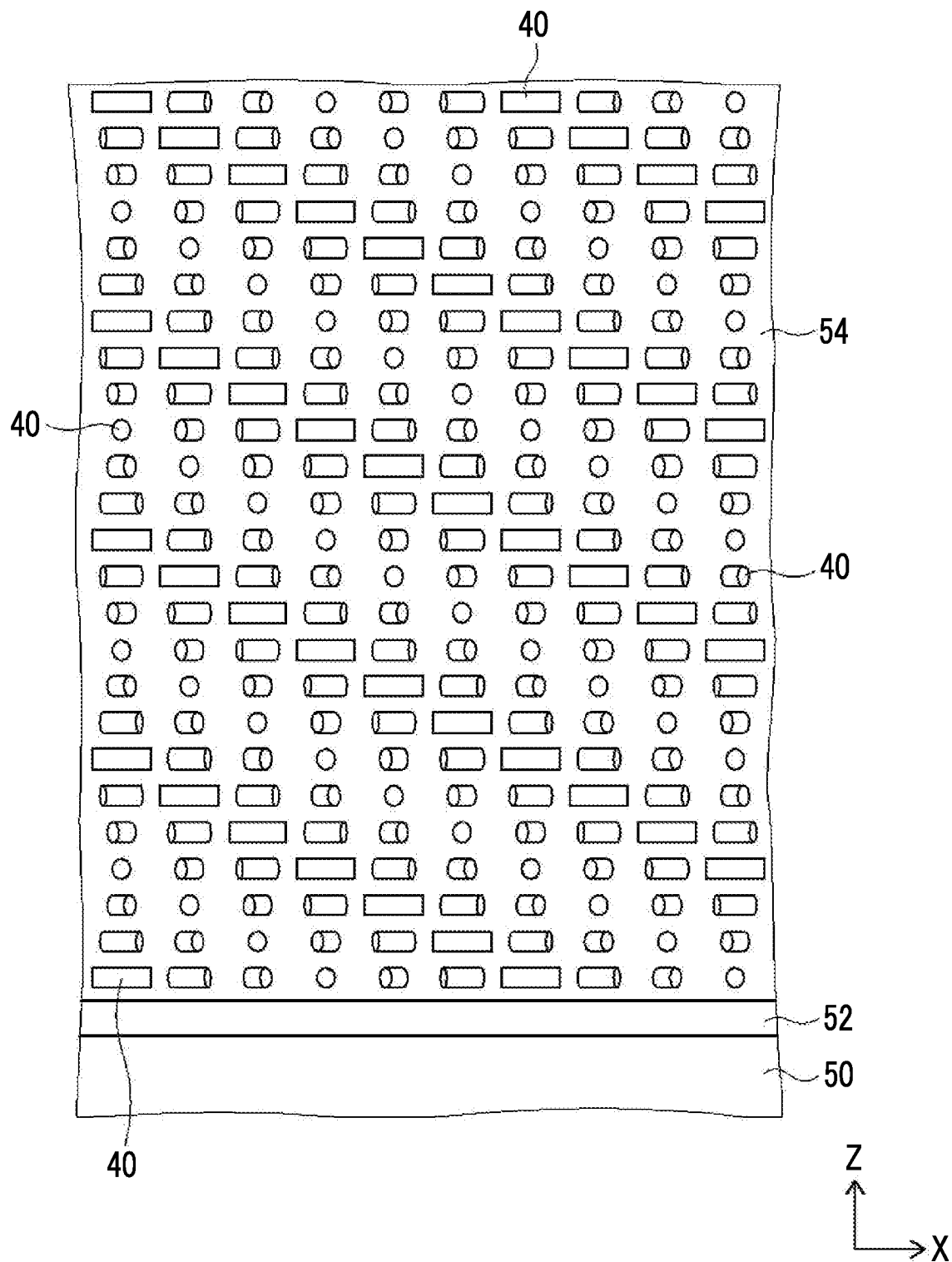
FIG. 3 is a diagram conceptually showing an example of a liquid crystal diffraction element.

FIG. 3 is a diagram conceptually showing a layer configuration of the liquid crystal diffraction element. As conceptually shown in FIG. 3, the liquid crystal diffraction element includes a support 50, an alignment film 52, and a cholesteric liquid crystal layer 54 as a liquid crystal diffraction layer that exhibits an action as a diffraction element.

Figure 4:
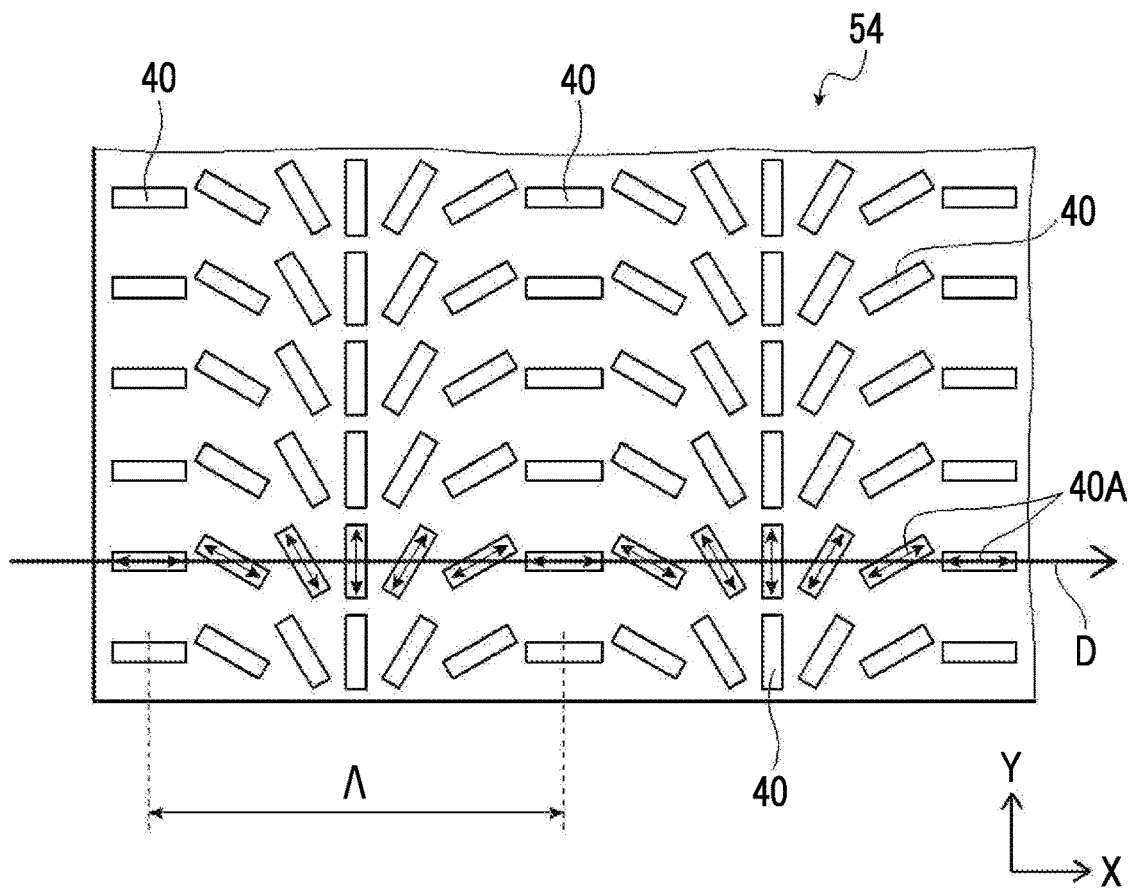
FIG. 4 is a plan view conceptually showing a liquid crystal layer of the liquid crystal diffraction element shown in FIG. 3.

FIG. 4 is a schematic diagram showing an alignment state of a liquid crystal compound in a plane of a main surface of the cholesteric liquid crystal layer 54.

In the following description, it is assumed that a main surface of the cholesteric liquid crystal layer 54 is an X-Y plane and a cross-section perpendicular to the X-Y plane is an X-Z plane. That is, FIG. 3 corresponds to a schematic diagram of the X-Z plane of the cholesteric liquid crystal layer 54, and FIG. 4 corresponds to a schematic diagram of the X-Y plane of the cholesteric liquid crystal layer 54.

As shown in FIG. 3, the cholesteric liquid crystal layer 54 is a layer obtained by cholesteric alignment of a liquid crystal compound. In addition, FIGS. 3 to 5 show an example in which the liquid crystal compound forming the cholesteric liquid crystal layer is a rod-like liquid crystal compound.

In the following description, the cholesteric liquid crystal layer will also be referred to as "liquid crystal layer".

The liquid crystal diffraction element shown in FIG. 3 includes the support 50, the alignment film 52, and the liquid crystal layer 54. However, the present invention is not limited to this configuration. The liquid crystal diffraction element may include only the alignment film 52 and the liquid crystal layer 54 by peeling off the support 50 after bonding the laminate to the light guide plate 18 and the like. Alternatively, the liquid crystal diffraction element may include only the liquid crystal layer 54 by peeling off the support 50 and the alignment film 52 after bonding the laminate to the light guide plate 18 and the like.

Support>

The support 50 supports the alignment film 52 and the liquid crystal layer 54.

As the support 50, various sheet-shaped materials (films or plate-shaped materials) can be used as long as they can support the alignment film 52 and the liquid crystal layer 54.

A transmittance of the support 50 with respect to corresponding light is preferably 50% or higher, more preferably 70% or higher, and still more preferably 85% or higher.

The thickness of the support 50 is not particularly limited and may be appropriately set depending on the use of the liquid crystal diffraction element, a material for forming the support 50, and the like in a range where the alignment film 52 and the liquid crystal layer 54 can be supported.

The thickness of the support 50 is preferably 1 to 2000 µm, more preferably 3 to 500 µm, and still more preferably 5 to 250 µm.

The support 50 may have a monolayer structure or a multi-layer structure.

In a case where the support 50 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 50 has a multi-layer structure, examples thereof include a support including: one of the above-described supports having a monolayer structure that is provided as a substrate; and another layer that is provided on a surface of the substrate.

<Alignment Film>

In the liquid crystal diffraction element, the alignment film 52 is formed on a surface of the support 50.

The alignment film 52 is an alignment film for aligning the liquid crystal compound 40 to a predetermined liquid crystal alignment pattern during the formation of the liquid crystal layer 54.

Although described below, in the present invention, the liquid crystal layer 54 has a liquid crystal alignment pattern in which a direction of an optical axis 40A (refer to FIG. 4) derived from the liquid crystal compound 40 changes while continuously rotating in one in-plane direction. Accordingly, the alignment film 52 is formed such that the liquid crystal layer 54 can form the liquid crystal alignment pattern.

In the following description, "the direction of the optical axis 40A rotates" will also be simply referred to as "the optical axis 40A rotates".

As the alignment film 52, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as w-tricosanoic acid, dioctadecylmethylammonium chloride, or methyl stearate.

The alignment film 52 formed by a rubbing treatment can be formed by rubbing a surface of a polymer layer with paper or fabric in a given direction multiple times.

As the material used for the alignment film 52, for example, a material for forming polyimide, polyvinyl alcohol, a polymer having a polymerizable group described in JP1997-152509A (JP-H9-152509A), or an alignment film 52 such as JP2005-97377A, JP2005-99228A, and JP2005-128503A is preferable.

In the liquid crystal diffraction element, for example, the alignment film 52 can be suitably used as a so-called photo-alignment film obtained by irradiating a photo-alignment material with polarized light or non-polarized light. That is, in the liquid crystal diffraction element, a photo-alignment film that is formed by applying a photo-alignment material to the support 50 is suitably used as the alignment film 52.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

The thickness of the alignment film 52 is not particularly limited. The thickness with which a required alignment function can be obtained may be appropriately set depending on the material for forming the alignment film 52.

The thickness of the alignment film 52 is preferably 0.01 to 5 m and more preferably 0.05 to 2 km.

A method of forming the alignment film 52 is not limited. Any one of various well-known methods corresponding to a material for forming the alignment film 52 can be used. For example, a method including: applying the alignment film 52 including a photo-alignment material to a surface of the support 50; drying the applied alignment film 52; and exposing the alignment film 52 to laser light to form an alignment pattern can be used.

Figure 9:
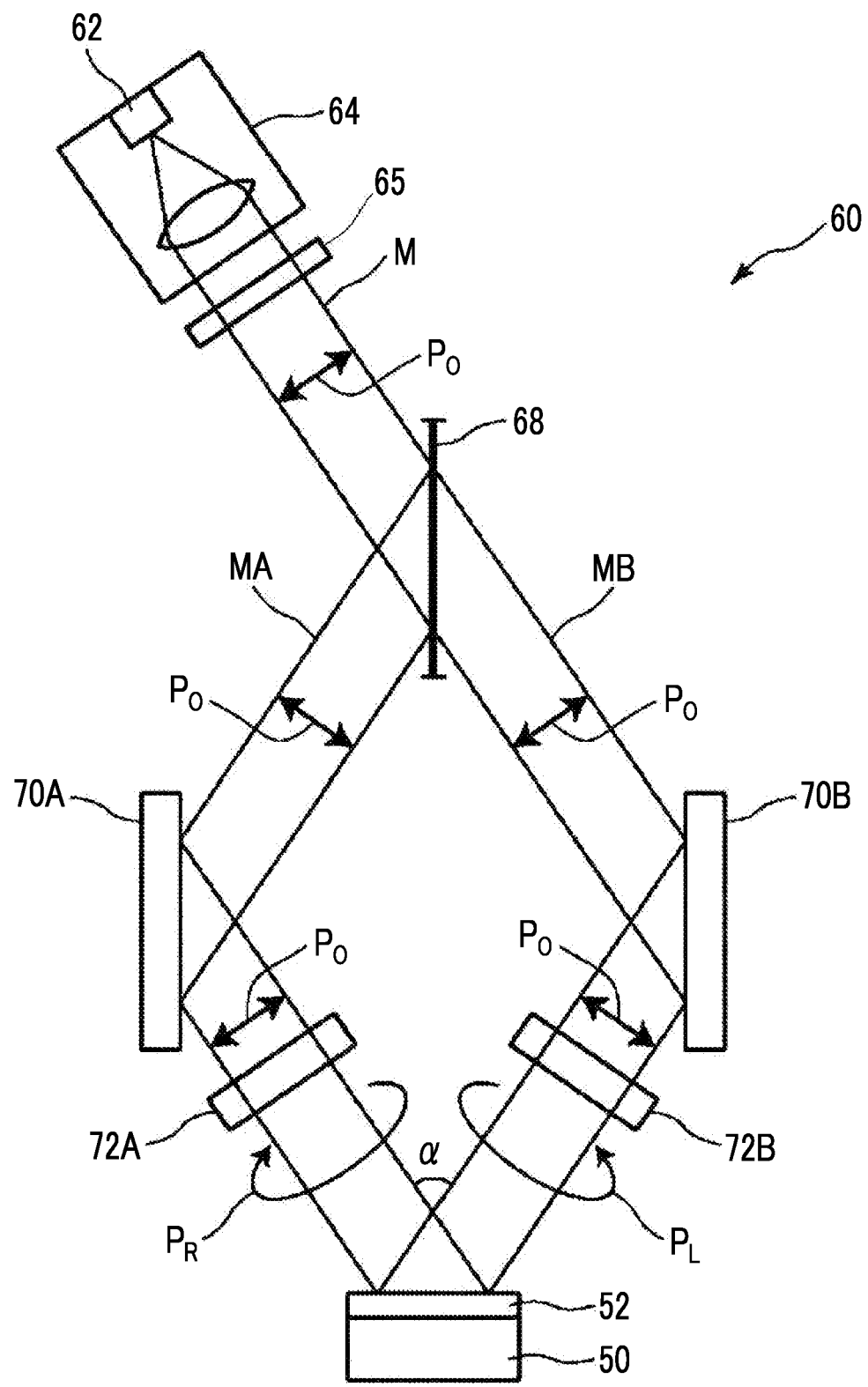
FIG. 9 is a conceptual diagram showing an example of an exposure device that exposes an alignment film.

FIG. 9 conceptually shows an example of an exposure device that exposes the alignment film 52 to form an alignment pattern.

An exposure device 60 shown in FIG. 9 includes: a light source 64 including a laser 62; a λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the split two beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 50 including the alignment film 52 on which the alignment pattern is not yet formed is disposed at an exposed portion, the two beams MA and MB intersect and interfere with each other on the alignment film 52, and the alignment film 52 is irradiated with and exposed to the interference light.

Due to the interference in this case, the polarization state of light with which the alignment film 52 is irradiated periodically changes according to interference fringes. As a result, an alignment film having an alignment pattern in which the alignment state periodically changes can be obtained. In the following description, this alignment film having the alignment pattern will also be referred to as "patterned alignment film".

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length (period A in the diffraction structure) of the single period over which the optical axis 40A rotates by 180° in the one in-plane direction in which the optical axis 40A rotates can be adjusted.

By forming the cholesteric liquid crystal layer on the alignment film 52 having the alignment pattern in which the alignment state periodically changes, as described below, the liquid crystal layer 54 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has a liquid crystal alignment pattern in which the liquid crystal compound is aligned such that the direction of the optical axis of the liquid crystal compound in the liquid crystal layer formed on the patterned alignment film changes while continuously rotating in at least one in-plane direction.

In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 52 is provided as a preferable aspect and is not an essential component.

For example, the following configuration can also be adopted, in which, by forming the alignment pattern on the support 50 using a method of rubbing the support 50, a method of processing the support 50 with laser light or the like, the liquid crystal layer has the liquid crystal alignment pattern in which the direction of the optical axis 40A derived from the liquid crystal compound 40 changes while continuously rotating in at least one in-plane direction. That is, in the present invention, the support 50 may be made to function as the alignment film.

<Liquid Crystal Layer (Cholesteric Liquid Crystal Layer)>

In the liquid crystal diffraction element, the liquid crystal layer 54 is formed on a surface of the alignment film 52.

The liquid crystal layer 54 is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 3, the liquid crystal layer 54 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch (helical pitch P), and plural pitches of the helically turned liquid crystal compound 40 are laminated.

As is well known, the cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

For example, in the liquid crystal layer 54 that selectively reflects right circularly polarized light, the helical twisted direction of the cholesteric liquid crystalline phase is the right direction.

The turning direction of the cholesteric liquid crystalline phase can be adjusted by adjusting the kind of the liquid crystal compound that forms the cholesteric liquid crystal layer and/or the kind of the chiral agent to be added.

In addition, a half-width Δλ (nm) of a selective reflection wavelength range (circularly polarized light reflection wavelength range) where selective reflection is exhibited depends on Δn of the cholesteric liquid crystalline phase and the helical pitch P and satisfies a relationship of Δλ=Δn×P. Therefore, the width of the selective reflection wavelength range can be controlled by adjusting Δn. Δn can be adjusted by adjusting a kind of a liquid crystal compound for forming the cholesteric liquid crystal layer and a mixing ratio thereof, and a temperature during alignment immobilization.

Accordingly, regarding the wavelength of light that is reflected (diffracted) by the liquid crystal diffraction element, the selective reflection wavelength range of the liquid crystal layer 54 may be set, for example, by adjusting the helical pitch P of the liquid crystal layer 54 according to each of the liquid crystal diffraction elements.

The half-width of the reflection wavelength range is appropriately adjusted depending on the use of the optical element 12 and the wavelength range corresponding to the diffraction element where the liquid crystal layer 54 is provided. For example, the half-width of the reflection wavelength range may be 10 to 500 nm and is preferably 20 to 300 nm and more preferably 30 to 100 nm.

As shown in FIG. 4, in the X-Y plane of the liquid crystal layer 54, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. In the example shown in the drawing, the optical axis 40A rotates clockwise in the arrangement axis D.

In the example shown in the drawing, for example, it is assumed that the arrangement axis D is directed to the X direction. In addition, in the Y direction, the liquid crystal compounds 40 in which the directions of the optical axes 40A are the same are arranged at regular intervals.

Specifically, "the direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 4, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°. In the present specification, represents "degree".

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the diffraction element (liquid crystal diffraction element) including the liquid crystal layer 54 (liquid crystal diffraction layer), the arrangement axis D direction (X direction), that is, the direction (in-plane rotation direction) in which the optical axis 40A of the liquid crystal compound 40 rotates in a plane of the liquid crystal layer 54 is the periodic direction in the diffraction structure of the diffraction element. In the example shown in the drawing, for example, as described above, the direction in which the optical axis 40A rotates clockwise is the periodic direction in the diffraction structure of the diffraction element.

In the following description, "the periodic direction in the diffraction structure of the diffraction element" will also be referred to as "periodic direction".

In the diffraction element (liquid crystal diffraction element) including the liquid crystal layer 54 (liquid crystal diffraction layer), in the liquid crystal alignment pattern of the liquid crystal compound 40, the length (distance) over which the optical axis 40A rotates by 180° in the arrangement axis D direction in which the optical axis 40A changes while continuously rotating in a plane is the period Λ (in-plane rotation period Λ) in the diffraction structure of the diffraction element. That is, in the diffraction element including the liquid crystal layer 54 having the liquid crystal alignment pattern, The length (distance) over which the optical axis 40A of the liquid crystal compound 40 rotates by 180° in the periodic direction is the period Λ in the diffraction structure of the diffraction element.

In the following description, "the period Λ in the diffraction structure of the diffraction element" will also be referred to as "diffraction period Λ".

That is, a distance between centers of two liquid crystal compounds 40 in the arrangement axis D direction (periodic direction) is the diffraction period Λ, the two liquid crystal compounds having the same angle in the arrangement axis D direction (periodic direction). Specifically, as shown in FIG. 4, a distance between centers in the arrangement axis D direction of two liquid crystal compounds 40 in which the arrangement axis D direction and the direction of the optical axis 40A match each other is the diffraction period Λ.

In the liquid crystal alignment pattern of the liquid crystal layer 54, the diffraction period Λ is repeated in the arrangement axis D direction, that is, in the one in-plane direction in which the direction of the optical axis 40A changes while continuously rotating.

As described above, in the optical element 12 according to the embodiment of the present invention, the incidence portion 20 and the emission portion 24 include, as the incidence element and the emission element, the Λ1 diffraction element including the liquid crystal layer 54 where the diffraction period is Λ1, the Λ2 diffraction element including the liquid crystal layer 54 where the diffraction period is Λ2, and the Λ3 diffraction element including the liquid crystal layer 54 where the diffraction period is Λ3.

On the other hand, in the liquid crystal compound 40 forming the liquid crystal layer 54, the directions of the optical axes 40A are the same in the direction (in FIG. 4, the Y direction) perpendicular to the arrangement axis D direction as the periodic direction, that is, the Y direction perpendicular to the one in-plane direction in which the optical axis 40A continuously rotates.

In other words, in the liquid crystal compound 40 forming the liquid crystal layer 54, angles between the optical axes 40A of the liquid crystal compound 40 and the arrangement axis D (X direction) are the same in the Y direction.

In a case where a cross-section of the cholesteric liquid crystal layer in a thickness direction is observed with a scanning electron microscope (SEM), a stripe pattern in which bright portions and dark portions derived from a cholesteric liquid crystalline phase are alternately provided is observed.

Figure 5:
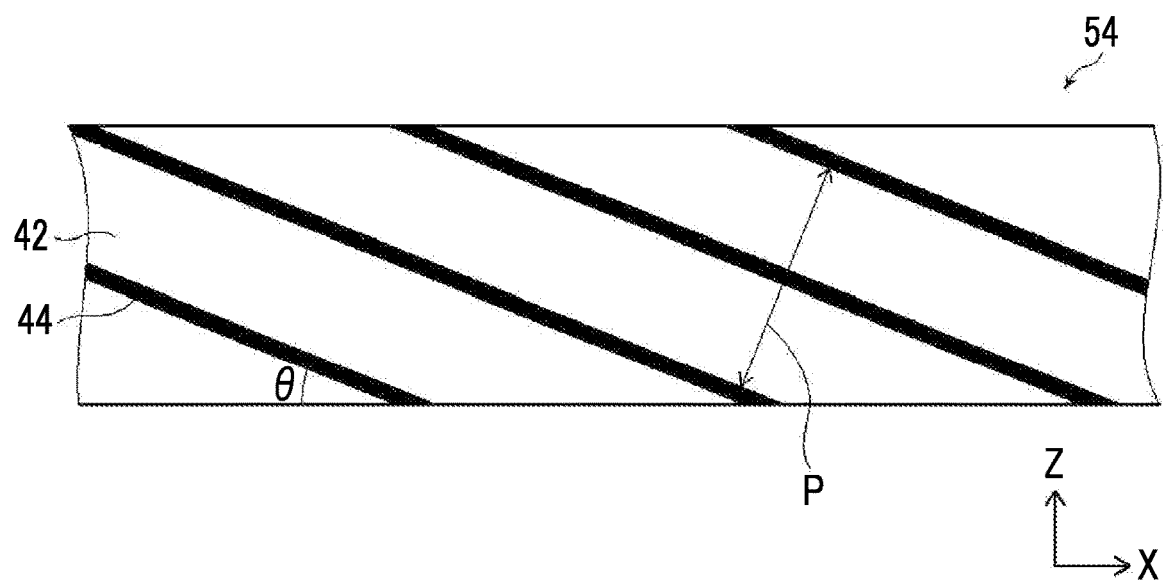
FIG. 5 is a diagram conceptually showing a cross-sectional scanning electron microscopic (SEM) image of the liquid crystal layer shown in FIG. 4.

Here, in a case where an X-Z plane of the liquid crystal layer 54 shown in FIG. 3, that is, a cross-section in the thickness direction is observed with an SEM, a stripe pattern in which bright portions 42 and dark portions 44 are tilted at a predetermined tilt angle θ with respect to the main surface (X-Y plane) as shown in FIG. 5 is observed.

This tilt angle θ is not particularly limited and is preferably 10° or more and more preferably 20° or more. It is preferable that the tilt angle θ is 10° or more from the viewpoint of obtaining a high diffraction efficiency at a large diffraction angle.

In this SEM cross-section, an interval between the bright portions 42 adjacent to each other or between the dark portions 44 adjacent to each other in a normal direction of lines formed by the bright portions 42 or the dark portions 44 corresponds to a ½ pitch. That is, as indicated by P in FIG. 5, two bright portions 42 and two dark portions 44 correspond to one helical pitch (one helical turn), that is, the helical pitch P.

Hereinafter, an action of diffraction of the liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with an SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

On the other hand, the liquid crystal layer 54 reflects incident light in a state where it is tilted in the arrangement axis D direction as the periodic direction with respect to the specular reflection.

Figure 6:
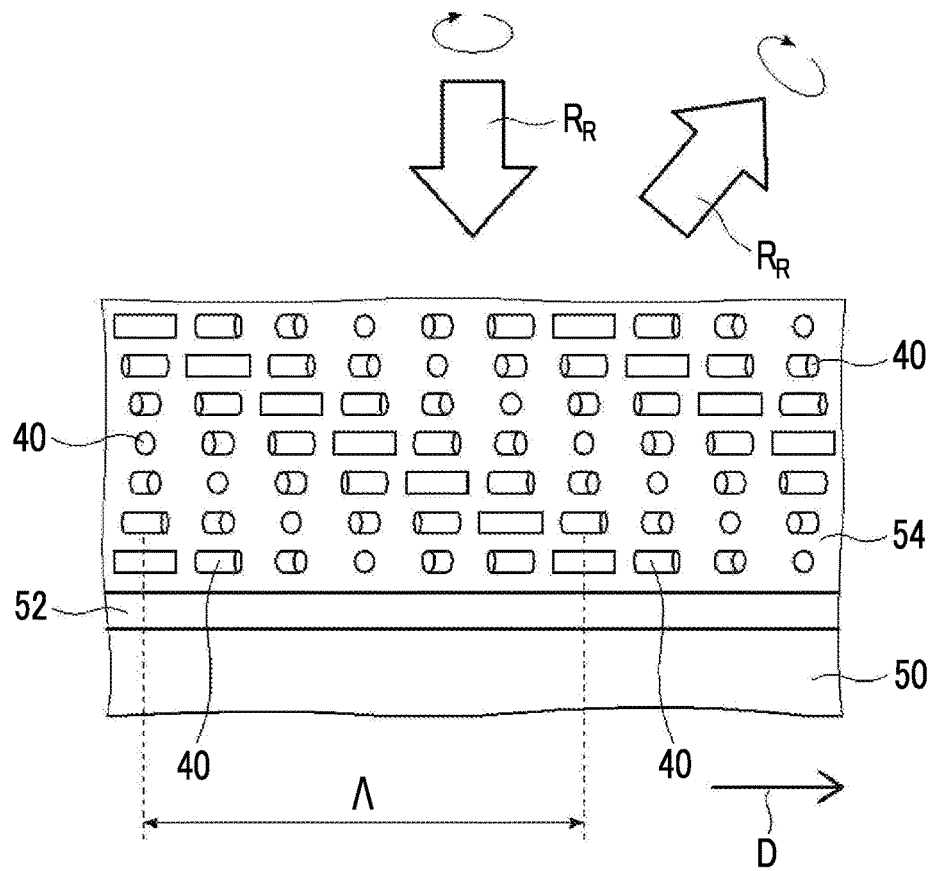
FIG. 6 is a conceptual diagram showing an action of the liquid crystal layer shown in FIG. 4.

Hereinafter, the description will be made with reference to FIG. 6.

For example, it is assumed that the liquid crystal layer 54 is a cholesteric liquid crystal layer that selectively reflects right circularly polarized light $R_R$ of red light. Accordingly, in a case where light is incident into the liquid crystal layer 54, the liquid crystal layer 54 reflects only right circularly polarized light $R_R$ of red light and allows transmission of the other light.

The liquid crystal layer 54 has the liquid crystal alignment pattern in which the optical axis 40A of the liquid crystal compound 40 changes while continuously rotating in the arrangement axis D direction as the periodic direction.

The liquid crystal alignment pattern in the liquid crystal layer 54 is a pattern that is periodic in the arrangement axis D direction. Therefore, as conceptually shown in FIG. 6, the right circularly polarized light $R_R$ of red light incident into the liquid crystal layer 54 is reflected (diffracted) in a direction corresponding to the period of the liquid crystal alignment pattern, and the reflected right circularly polarized light $R_R$ of red light is reflected (diffracted) in a direction tilted with respect to the XY plane (the main surface of the cholesteric liquid crystal layer) in the arrangement axis D direction.

As a result, in a case where the liquid crystal layer 54 is applied to the optical element, the liquid crystal layer 54 can be used as a diffraction element in which light incident from a direction perpendicular to the main surface of the light guide plate can be reflected (diffracted) at an angle at which total reflection occurs in the light guide plate and the light guided in the light guide plate by total reflection can be reflected (diffracted) in a direction perpendicular to the main surface of the light guide plate.

In the liquid crystal layer 54, by appropriately setting the arrangement axis D direction as the one in-plane direction in which the optical axis 40A rotates, the reflection direction (diffraction angle) of light can be adjusted.

For example, in a case where circularly polarized light having the same wavelength and the same turning direction is reflected, by reversing the arrangement axis D direction as the periodic direction, a reflection direction of the circularly polarized light can be reversed. In other words, by setting the rotation direction of the optical axis 40A of the liquid crystal compound 40 toward the arrangement axis D direction, that is, the periodic direction to be counterclockwise, the reflection direction of circularly polarized light can be reversed.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

That is, in the liquid crystal layers where the helical turning directions are opposite to each other, the arrangement axis D directions are adjusted to be opposite to each other, that is, to be different by 180°, light can be tilted and diffracted (reflected) in the same direction. In other words, in the liquid crystal layer having an opposite helical turning direction, by setting the rotation direction of the optical axis 40A of the liquid crystal compound 40 toward the arrangement axis D direction, that is, the periodic direction to be counterclockwise, light can be tilted and diffracted in the same direction.

As described above, in the liquid crystal diffraction element, in the liquid crystal alignment pattern of the liquid crystal compound in the liquid crystal layer, the in-plane period A as the length over which the optical axis of the liquid crystal compound rotates by 180° is the single period in the diffraction structure (the periodic structure of the diffraction element), that is, the diffraction period Λ. In addition, in the liquid crystal layer, the one in-plane direction (arrangement axis D direction) in which the optical axis of the liquid crystal compound changes while rotating is the periodic direction in the diffraction structure (the periodic structure of the diffraction element).

In the optical element 12 according to the embodiment of the present invention, the length of the diffraction period Λ of the liquid crystal diffraction element is not particularly limited, and may be appropriately adjusted depending on the incidence angle into the light guide plate 18, the size of diffraction of light for emitting the light from the light guide plate 18, and the like.

In the liquid crystal layer having the liquid crystal alignment pattern, as the diffraction period A decreases, the diffraction increases. That is, as the diffraction period Λ decreases, reflected light can be reflected in a state where it is largely tilted with respect to the specular reflection direction of incidence light. In other words, as the diffraction period Λ decreases, an angle between the specular reflection direction and the reflected light increases.

As described above, in the optical element 12 according to the embodiment of the present invention, the incidence portion 20 and the emission portion 24 include, as the incidence element and the emission element, three kinds of diffraction elements including the Λ1 diffraction element where the diffraction period is Λ1, the Λ2 diffraction element where the diffraction period is Λ2, and the Λ3 diffraction element where the diffraction period is Λ3. In addition, the diffraction period Λ1, the diffraction period Λ2, and the diffraction period Λ3 satisfy a relationship of "Λ1:Λ2:Λ3=1:1/√2±0.015:1/2±0.015".

In addition, in the liquid crystal layer having the liquid crystal alignment pattern, the reflection angle (diffraction angle) of light varies depending on the wavelength of light to be reflected. Specifically, as the wavelength of light increases, the angle of reflected light with respect to incidence light increases.

In the example shown in FIG. 3, a configuration in which, on the X-Z plane of the liquid crystal layer 54, the optical axes 40A of the liquid crystal compound 40 is aligned to be parallel with respect to the main surface (X-Y plane) is adopted.

However, the present invention is not limited to this configuration. For example, as conceptually shown in FIG. 7, a configuration in which, on the X-Z plane of the liquid crystal layer 54, the optical axes 40A of the liquid crystal compound 40 is aligned to be tilted with respect to the main surface (X-Y plane) may be adopted.

Figure 7:
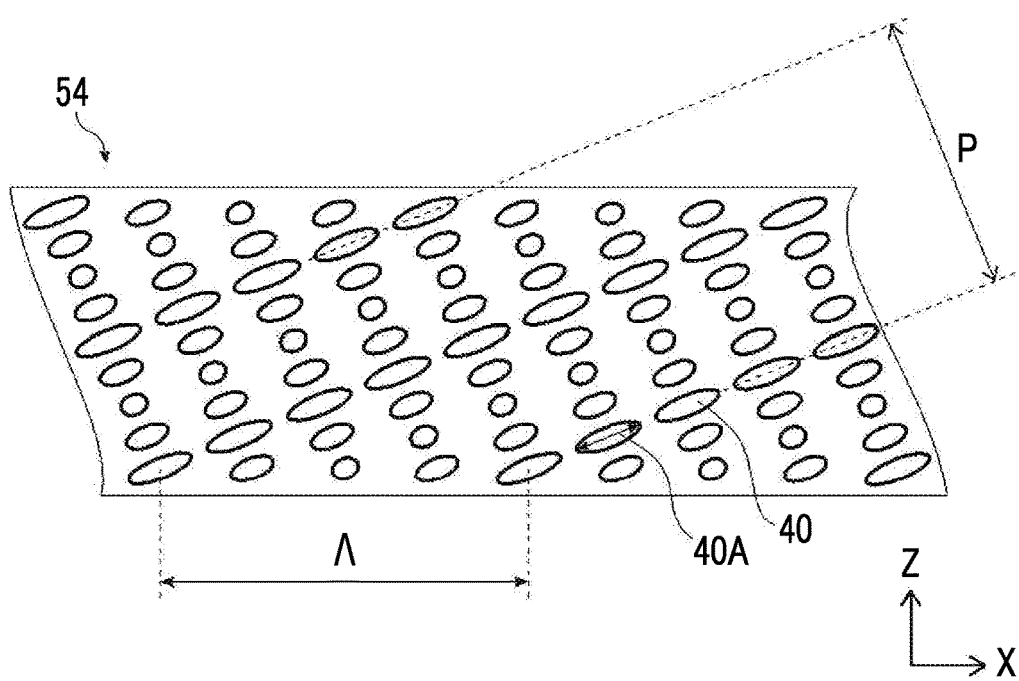
FIG. 7 is a diagram conceptually showing another example of the liquid crystal layer used in the liquid crystal diffraction element.

In addition, the example shown in FIG. 7 shows the configuration in which, on the X-Z plane of the liquid crystal layer 54, the tilt angle of the liquid crystal compound 40 with respect to the main surface (X-Y plane) is uniform in the thickness direction (Z direction). However, the present invention is not limited to this configuration. In the liquid crystal layer 54, a region where the tilt angle of the liquid crystal compound 40 varies in the thickness direction may be provided.

Figure 8:
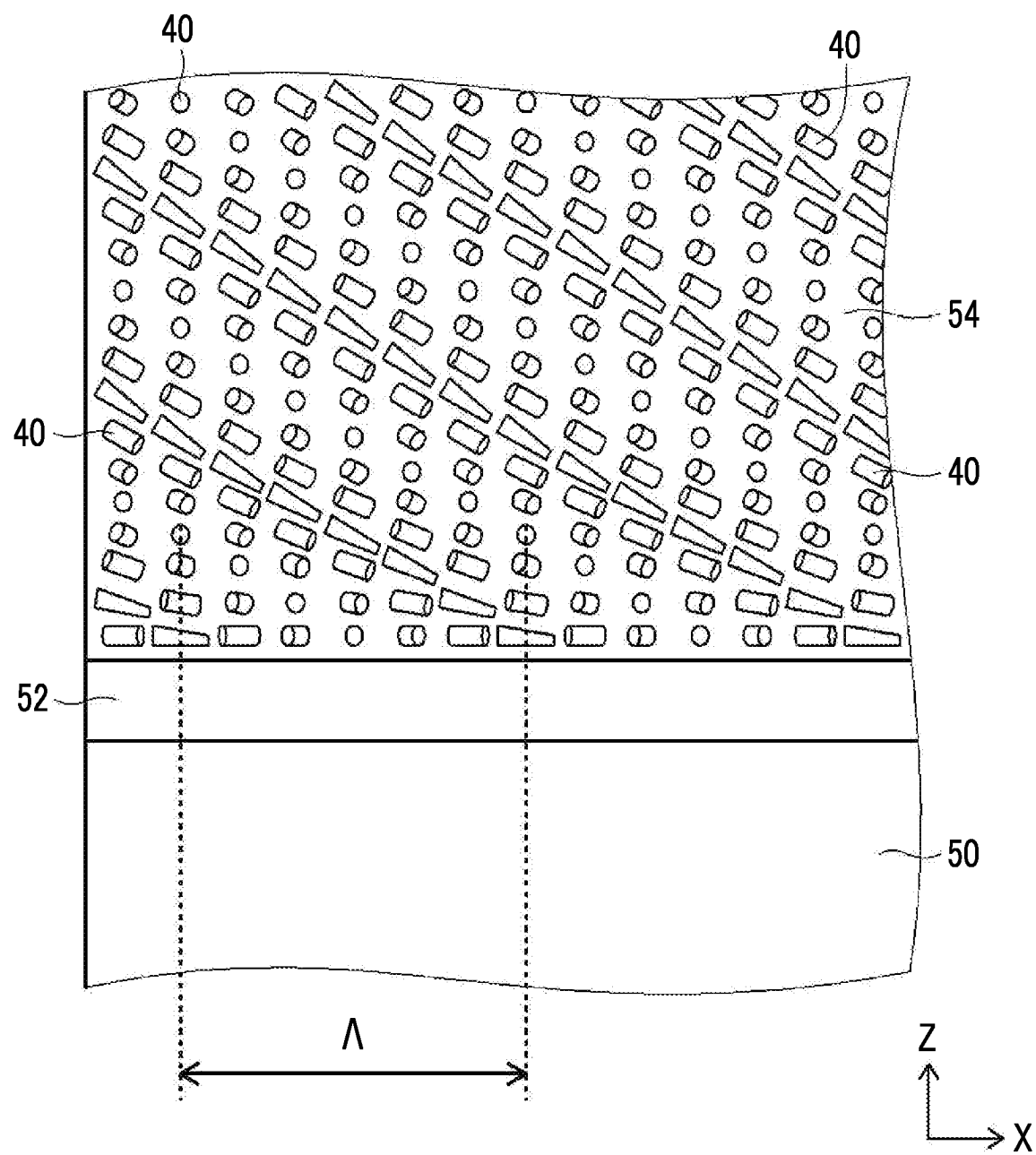
FIG. 8 is a diagram conceptually showing another example of the liquid crystal layer used in the liquid crystal diffraction element.

For example, in an example shown in FIG. 8, the optical axis 40A of the liquid crystal compound 40 at an interface of the liquid crystal layer on the alignment film 52 side is parallel to the main surface (the pretilt angle is 0°), the tilt angle of the liquid crystal compound 40 increases in a direction away from the interface on the alignment film 52 side to the thickness direction, and the liquid crystal compound is aligned at a given tilt angle on another interface (air interface).

In the cross-section of the liquid crystal layer 54 shown in FIG. 8 observed with an SEM, as the angle of the bright portions and the dark portions derived from the cholesteric liquid crystalline phase with respect to the main surface, that is, the tilt angle θ (refer to FIG. 5) gradually increases as the distance from the interface on the alignment film 52 side increases in the thickness direction.

In this liquid crystal layer 54, the helical pitch P of the cholesteric liquid crystalline phase changes in the thickness direction. That is, in the liquid crystal layer 54, the helical pitch P gradually increases as the distance from the interface on the alignment film 52 side increases in the thickness direction.

As described above, the wavelength of light to be selectively reflected by the liquid crystal layer 54 (cholesteric liquid crystalline phase) varies depending on the helical pitch, and as the helical pitch P increases, the wavelength of light to be selectively reflected increases. Accordingly, in the liquid crystal layer 54 shown in FIG. 8 where the tilt angle θ gradually increases as the distance from the interface on the alignment film 52 side increases in the thickness direction, light in a wide wavelength range can be reflected.

In the liquid crystal layer 54 shown in FIG. 8 where the tilt angle θ gradually increases as the distance from the interface on the alignment film 52 side increases in the thickness direction, it is preferable that the tilt angle θ has a region of 10° or more.

In the liquid crystal layer 54, it is preferable that the tilt angle θ has a region of 10° or more from the viewpoint of obtaining a large diffraction angle with a high diffraction efficiency.

In this liquid crystal layer 54, it is more preferable that the tilt angle θ has a region of 20° or more, and it is still more preferable that the tilt angle θ has a region of 30° or more.

In addition, in the liquid crystal layer 54 where the tilt angle θ gradually increases as the distance from the interface on the alignment film 52 side increases in the thickness direction, it is also preferable that a difference between a maximum value and a minimum value of the tilt angle θ is 10° or more.

It is preferable that the difference between the maximum value and the minimum value of the tilt angle θ is 10° or more from the viewpoints that the diffraction angle of light can increase and the wavelength range of light to be selectively reflected from the liquid crystal layer 54 can be widened.

In the liquid crystal layer 54, the difference between the maximum value and the minimum value of the tilt angle θ is more preferably 15° or more and still more preferably 20° or more.

This way, the liquid crystal layer 54 may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the liquid crystal layer 54 with a polarization microscope. In particular, it is preferable that, on the X-Z plane of the liquid crystal layer 54, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the liquid crystal diffraction element (liquid crystal layer 54) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is preferable that the tilt angle is controlled by treating the interface of the liquid crystal layer 54.

By pretilting the alignment film on the support side interface, the tilt angle of the liquid crystal compound can be controlled. For example, by exposing the alignment film to ultraviolet light from the front and subsequently obliquely exposing the alignment film during the formation of the alignment film, the liquid crystal compound in the liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the alignment film. In this case, the additive can be used as a factor for further improving the diffraction efficiency.

This additive can also be used for controlling the pretilt angle on the air side interface.

Here, in a cross-section of the liquid crystal layer 54 observed with an SEM, the bright portions and the dark portions derived from a cholesteric liquid crystalline phase are tilted with respect to the main surface. In the liquid crystal layer 54, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the liquid crystal layer 54 is tilted with respect to the main surface and the tilt direction substantially matches the bright portions and the dark portions of the liquid crystal layer 54. The normal direction is a direction perpendicular to the main surface.

By the liquid crystal layer 54 having the above-described configuration, circularly polarized light can be diffracted with a higher diffraction efficiency than the liquid crystal layer in which the liquid crystal compound 40 is parallel to the main surface.

In the configuration in which the liquid crystal compound 40 of the liquid crystal layer 54 is tilted with respect to the main surface and the tilt direction substantially matches with the bright portions and the dark portions, bright portions and dark portions corresponding to a reflecting surface matches with the optical axis 40A of the liquid crystal compound 40. Therefore, the action of the liquid crystal compound 40 on light reflection (diffraction) increases, the diffraction efficiency can be improved. As a result, the amount of reflected light with respect to incidence light can be further improved.

In the fast axis plane or the slow axis plane of the liquid crystal layer 54, the absolute value of the tilt angle of the optical axis of the liquid crystal layer 54 is preferably 5° or more, more preferably 15° or more, and still more preferably 20° or more.

It is preferable that the absolute value of the tilt angle of the optical axis is 15° or more from the viewpoint that the direction of the liquid crystal compound 40 matches with the bright portions and the dark portions more suitably such that the diffraction efficiency can be improved.

Further, the liquid crystal layer 54 may be a layer where, even in a case where the tilt angle θ of the bright portions and the dark portions does not gradually increase, the helical pitch of the cholesteric liquid crystalline phase gradually changes in the thickness direction. For example, the liquid crystal layer 54 may be a cholesteric liquid crystal layer where the helical pitch P gradually increases as the distance from the interface on the alignment film 52 side increases in the thickness direction.

As described above, the wavelength of light to be selectively reflected by the liquid crystal layer 54 (cholesteric liquid crystalline phase) varies depending on the helical pitch, and as the helical pitch P increases, the wavelength of light to be selectively reflected increases. Accordingly, in the liquid crystal layer 54 where the helical pitch P gradually increases in the thickness direction, light in a wide wavelength range can be reflected.

<<Method of Forming Liquid Crystal Layer>>

The liquid crystal layer 54 can be formed by immobilizing a liquid crystal phase in a layer shape, the liquid crystal phase obtained by aligning a liquid crystal compound in a predetermined alignment state. For example, the cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a liquid crystal phase is immobilized. Typically, the structure in which a liquid crystal phase is immobilized is preferably a structure which is obtained by making the polymerizable liquid crystal compound to be in a state where a predetermined liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

——Polymerizable Liquid Crystal Compound——

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

——Disk-Like Liquid Crystal Compound——

As the disk-like liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

——Surfactant——

The liquid crystal composition used for forming the liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

——Chiral Agent (Optically Active Compound)——

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide (chiral agent having an isosorbide structure), or an isomannide derivative can be used.

In addition, the chiral agent in which back isomerization, dimerization, isomerization, dimerization or the like occurs due to light irradiation such that the helical twisting power (HTP) decreases can also be suitably used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

——Crosslinking Agent——

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

——Other Additives——

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these crosslinking agents, one kind may be used alone, or two or more kinds may be used in combination. Among these, a ketone is preferable in consideration of an environmental burden.

In a case where the liquid crystal layer is formed, it is preferable that the liquid crystal layer is formed by applying the liquid crystal composition to a surface where the liquid crystal layer is to be formed, aligning the liquid crystal compound to a state of a desired liquid crystalline phase, and curing the liquid crystal compound.

That is, in a case where the cholesteric liquid crystal layer is formed on the alignment film 52, it is preferable that the liquid crystal layer obtained by immobilizing a cholesteric liquid crystalline phase is formed by applying the liquid crystal composition to the alignment film 52, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

In a case where a chiral agent where the HTP changes depending on the polarization of light is used as the chiral agent added to the liquid crystal composition, light irradiation (first exposure step) for changing the HTP of the chiral agent may be performed before light irradiation (second exposure step) for the polymerization of the liquid crystal compound. Alternatively, light irradiation by the photopolymerization of the liquid crystal compound may also be light irradiation for changing the HTP of the chiral agent. As a result, the above-described liquid crystal layer where the helical pitch P of the cholesteric liquid crystalline phase gradually changes can be obtained.

The thickness of the liquid crystal layer 54 is not particularly limited, and the thickness with which a required light reflectivity can be obtained may be appropriately set depending on the use of the optical element, the light reflectivity required for the liquid crystal layer, the material for forming the liquid crystal layer 54, and the like.

<Other Liquid Crystal Layers (Liquid Crystal Diffraction Elements)>

In the optical element in the example shown in the drawing, as the incidence element and the emission element, a reflective liquid crystal diffraction element including the liquid crystal layer 54 as a cholesteric liquid crystal layer is used. However, in the present invention, the liquid crystal diffraction layer including the liquid crystal diffraction element is not limited to this example.

For example, likewise, a liquid crystal diffraction element that has the liquid crystal alignment pattern where the optical axis continuously rotates in at least one in-plane direction and in which the liquid crystal compound does not form a cholesteric liquid crystalline phase in the thickness direction can also be used. The liquid crystal diffraction element may have a configuration in which the liquid crystal compound is helically twisted and rotates in the thickness direction to some extent that a cholesteric liquid crystalline phase is not formed.

Figure 10:
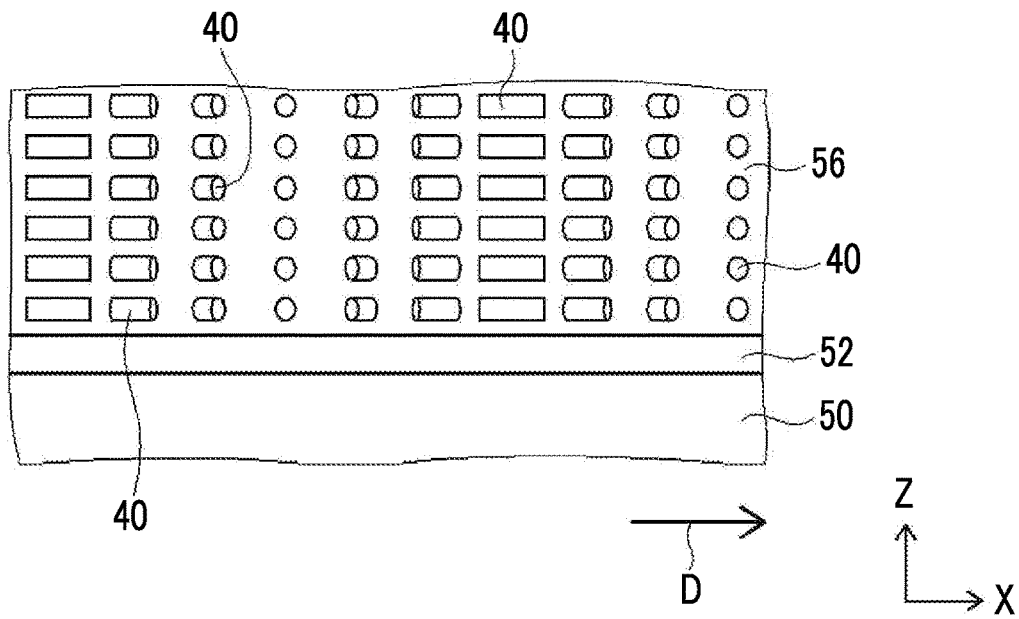
FIG. 10 is a diagram conceptually showing another example of the liquid crystal diffraction element.
Figure 11:
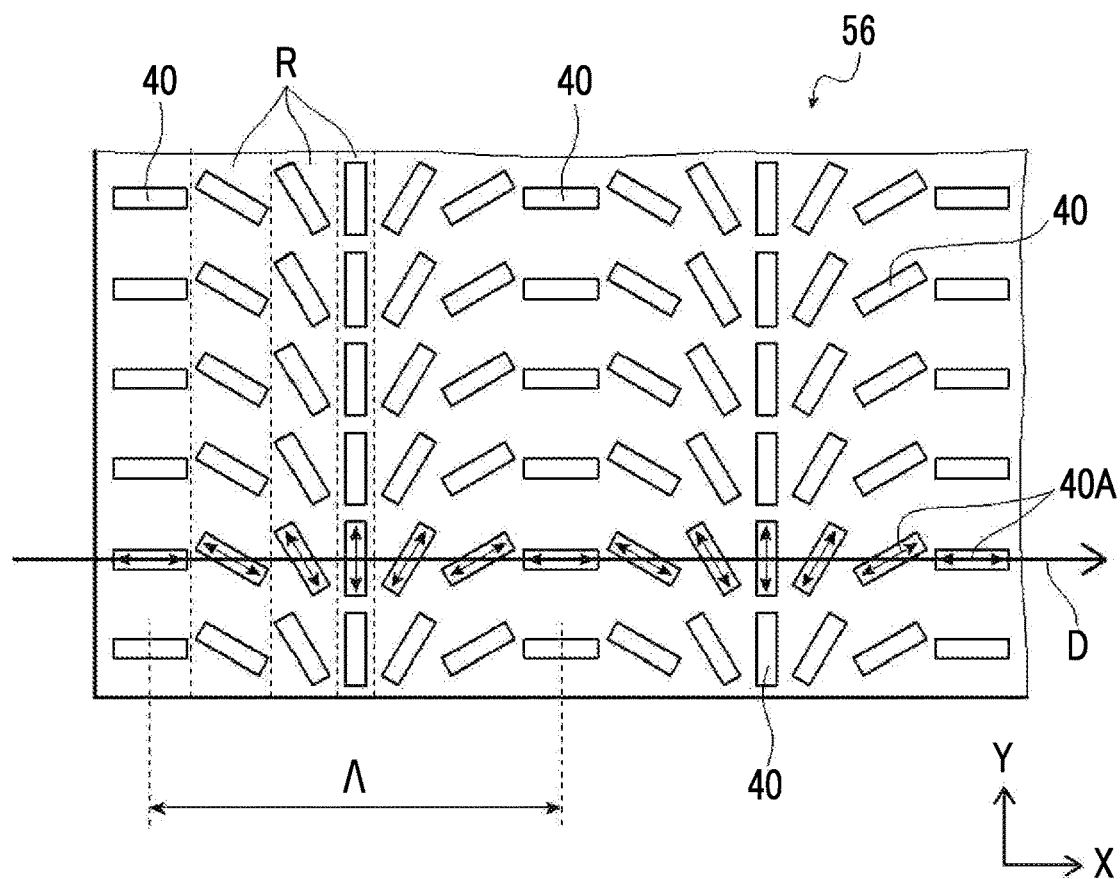
FIG. 11 is a plan view conceptually showing the liquid crystal layer of the liquid crystal diffraction element shown in FIG. 10.

FIGS. 10 and 11 show an example of another liquid crystal diffraction element.

A liquid crystal diffraction element shown in FIGS. 10 and 11 includes the support 50, the alignment film 52, and a liquid crystal layer 56. As the support 50 and the alignment film 52, those described above can be used.

As in the (cholesteric) liquid crystal layer 54 described above, the liquid crystal layer 56 of the liquid crystal diffraction element shown in FIG. 11 also has the liquid crystal alignment pattern in which the optical axis 40A of the liquid crystal compound 40 continuously rotates along the arrangement axis D. FIG. 11 also shows only the liquid crystal compound of the surface of the alignment film 52 as in FIG. 4.

As shown in FIG. 10, in the liquid crystal diffraction element, the liquid crystal compound 40 forming the liquid crystal layer 56 is not helically twisted and does not rotate in the thickness direction, and the optical axis 40A is positioned at the same position in the plane direction. The liquid crystal layer can be formed by adding a chiral agent to a liquid crystal composition during the formation of the liquid crystal layer.

As described above, the liquid crystal layer 56 has the liquid crystal alignment pattern in which the direction of the optical axis 40A derived from the liquid crystal compound 40 changes while continuously rotating in the arrangement axis D direction in a plane, that is, in the X direction. That is, in the liquid crystal layer 56 (liquid crystal diffraction element), the periodic direction is the arrangement axis D direction, that is, the X direction. In addition, even in the liquid crystal layer 56, as shown in FIG. 11, the diffraction period Λ (the single period of the diffraction structure) is the length over which the optical axis 40A rotates by 180° in the arrangement axis D direction, that is, the periodic direction.

On the other hand, regarding the liquid crystal compound 40 forming the liquid crystal layer 56, the liquid crystal compounds 40 having the same direction of the optical axes 40A are arranged at regular intervals in the Y direction perpendicular to the X direction, that is, the Y direction perpendicular to the arrangement axis D (periodic direction) as the one in-plane direction in which the optical axis 40A continuously rotates.

In other words, regarding the liquid crystal compound 40 forming the liquid crystal layer 56, in the liquid crystal compounds 40 arranged in the Y direction, angles between the directions of the optical axes 40A and the arrangement axis D direction are the same.

In the liquid crystal compounds arranged in the Y direction in the liquid crystal layer 56, the angles between the optical axes 40A and the X direction (the one in-plane direction in which the direction of the optical axis 40A of the liquid crystal compound 40 rotates) are the same. Regions where the liquid crystal compounds 40 in which the angles between the optical axes 40A and the arrangement axis D are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound 40.

In a case where circularly polarized light is incident into the above-described liquid crystal layer 56, the light is refracted such that the direction of the circularly polarized light is converted.

Figure 12:
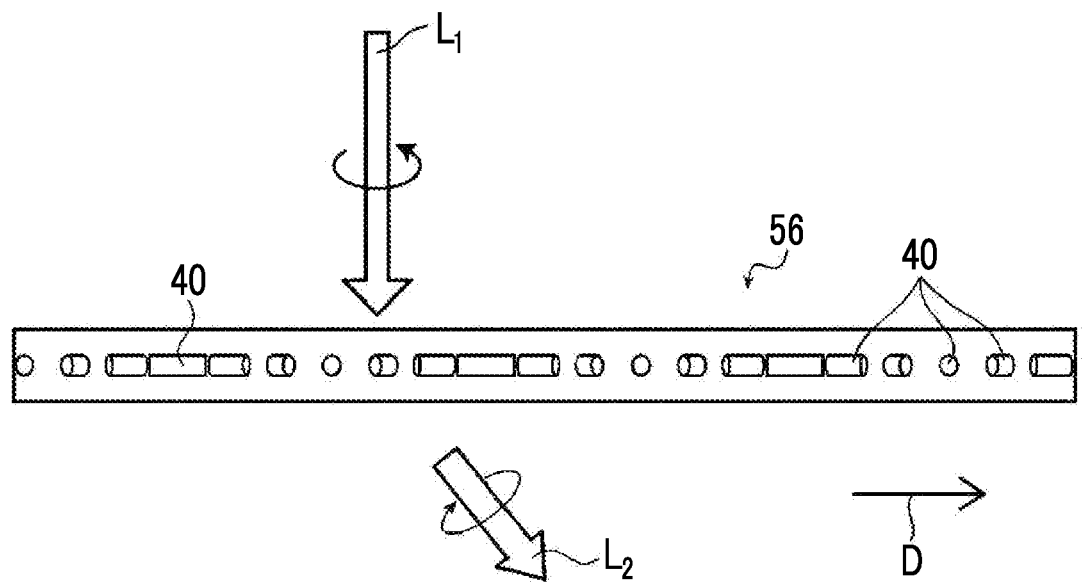
FIG. 12 is a conceptual diagram showing an action of the liquid crystal layer shown in FIG. 10.
Figure 13:
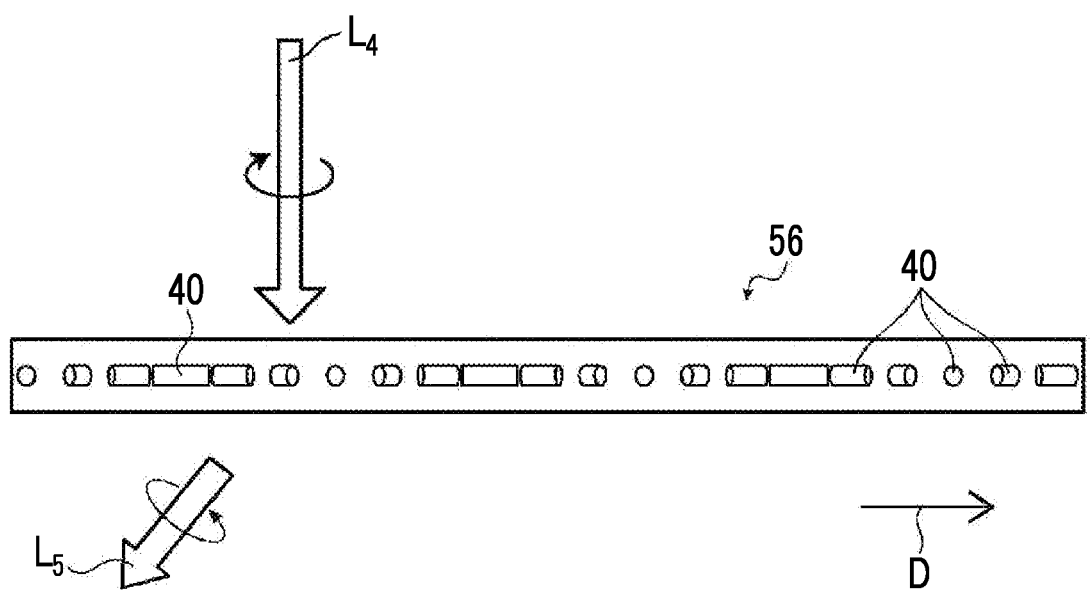
FIG. 13 is a conceptual diagram showing the action of the liquid crystal layer shown in FIG. 10.

This action is conceptually shown in FIGS. 12 and 13. In the liquid crystal layer 56, the value of the product of the difference in refractive index of the liquid crystal compound and the thickness of the optically-anisotropic layer is λ/2.

As shown in FIG. 12, in a case where the value of the product of the difference in refractive index of the liquid crystal compound 40 in the liquid crystal layer 56 and the thickness of the optically-anisotropic layer is λ/2 and incidence light $L_1$ as left circularly polarized light is incident into the liquid crystal layer 56, the incidence light $L_1$ transmits through the liquid crystal layer 56 to be imparted with a retardation of 180°, and the transmitted light $L_2$ is converted into right circularly polarized light.

In addition, the liquid crystal alignment pattern formed in the liquid crystal layer 56 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 13, in a case where the value of the product of the difference in refractive index of the liquid crystal compound 40 in the liquid crystal layer 56 and the thickness of the optically-anisotropic layer is λ/2 and incidence light $L_4$ of right circularly polarized light is incident into the liquid crystal layer 56, the incidence light $L_4$ transmits through the liquid crystal layer 56 to be imparted with a retardation of 180°, and the transmitted light $L_4$ is converted into transmitted light $L_5$ of left circularly polarized light.

In addition, the liquid crystal alignment pattern formed in the liquid crystal layer 56 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrangement axis D direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

Here, the liquid crystal diffraction element including the liquid crystal layer 56 is a transmissive liquid crystal diffraction element.

As in the liquid crystal layer 54, by changing the diffraction period Λ of the liquid crystal alignment pattern formed in the liquid crystal layer 56, refraction angles of the transmitted light $L_2$ and the transmitted light $L_5$ can be adjusted. Specifically, even in the liquid crystal layer 56, as the diffraction period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted. As described above, the diffraction periods Λ of the incidence element and the emission element are the diffraction period Λ1, the diffraction period Λ2, and the diffraction period Λ3 that satisfy the predetermined relationship.

In addition, by reversing the rotation direction of the optical axis 40A of the liquid crystal compound 40 that rotates in the arrangement axis D direction, that is, the periodic direction, the refraction direction of transmitted light can be reversed. That is, in the example FIGS. 10 to 13, the rotation direction of the optical axis 40A toward the arrangement axis D direction, that is, the periodic direction is clockwise. By setting this rotation direction to be counterclockwise, the refraction direction of transmitted light can be reversed.

From the viewpoint of diffraction efficiency, even in a case where the liquid crystal diffraction element that allows transmission of incidence light and diffracts incidence light is used, it is preferable to use a liquid crystal diffraction element having a region where the liquid crystal compound is twisted and rotates (the twisted angle is less than 360°). In particular, in a case where light is diffracted at an angle where the light is reflected in the light guide plate, from the viewpoint of diffraction efficiency, a liquid crystal diffraction element including a region in which a liquid crystal compound is twisted and rotates can be suitably used. In addition, from the viewpoint of diffraction efficiency, it is preferable to use a laminate in which liquid crystal diffraction elements having different angles at which the liquid crystal compound is twisted and rotates is laminated, or it is preferable to use a laminate in which liquid crystal diffraction elements having different directions in which the liquid crystal compound is twisted and rotates are laminated.

In the image display apparatus according to the embodiment of the present invention, in a case where a transmissive incidence element and a transmissive emission element are used, a positional relationship between the incidence portion, the emission portion, the display 14, and the user U is opposite to that in a case where the reflective incidence element and the reflective emission element shown in FIGS. 1 and 2 are used.

That is, in the image display apparatus (optical element) according to the embodiment of the present invention, in a case where a transmissive incidence element and a transmissive emission element are used, the incidence portion is positioned between the display 14 and the light guide plate 18, and the emission portion is positioned between the observation position by the user U and the light guide plate 18. Accordingly, the display image (emitted light) of the display 14 transmits through the incidence portion (incidence element), is refracted, and is incident into the light guide plate 18. The light that is incident into the light guide plate 18 and propagates in the light guide plate 18 while repeating total reflection is incident into the emission portion from the light guide plate 18, transmits through the emission portion, is refracted, and is emitted to the observation position by the user U.

In the optical element according to the embodiment of the present invention, the incidence portion and the emission portion may use different liquid crystal diffraction elements.

For example, a transmissive liquid crystal diffraction element including the liquid crystal layer 56 may be used as the incidence element in the incidence portion 20, and a reflective liquid crystal diffraction element including the liquid crystal layer 54 may be used as the emission element in the emission portion 24.

In the optical element 12 in the example shown in the drawing, the incidence portion 20 includes the incidence element, and the emission portion 24 includes the emission element. As described above, in the optical element 12 in the example shown in the drawing, the incidence element and the emission element are reflective liquid crystal diffraction elements including the liquid crystal layer 54 a cholesteric liquid crystal layer as the liquid crystal diffraction layer.

The incidence portion 20 includes the incidence element 26Λ1-1, the incidence element 26Λ1-2, the incidence element 28Λ2-1, the incidence element 28Λ2-2, the incidence element 30Λ3-1, and the incidence element 30Λ3-2 in this order from the light guide plate 18 side.

On the other hand, the emission portion 24 includes the emission element 34Λ1-1, the emission element 34Λ1-2, the emission element 36Λ2-1, the emission element 36Λ2-2, the emission element 36Λ2-3, the emission element 36Λ2-4, the emission element 38Λ3-1, and the emission element 38Λ3-2 in this order from the light guide plate 18.

Here, in the optical element 12 according to the embodiment of the present invention, both of the incidence portion 20 and the emission portion 24 include three kinds of diffraction elements having different diffraction periods Λ that include the Λ1 diffraction element where the diffraction period is Λ1, the Λ2 diffraction element where the diffraction period is Λ2, and the Λ3 diffraction element where the diffraction period is Λ3.

In the incidence portion 20, the incidence element 26Λ1-1 and the incidence element 26Λ1-2 are the Λ1 diffraction elements where the diffraction period is Λ1, the incidence element 28Λ2-1 and the incidence element 28Λ2-2 are the Λ2 diffraction elements where the diffraction period is Λ2, and the incidence element 30Λ3-1 and the incidence element 30Λ3-2 are the Λ3 diffraction element where the diffraction period is Λ3.

In the emission portion 24, the emission element 34Λ1-1 and the emission element 34Λ1-2 are the Λ1 diffraction elements where the diffraction period is Λ1, the emission element 36Λ2-1, the emission element 36Λ2-2, the emission element 36Λ2-3, and the emission element 36Λ2-4 are the Λ2 diffraction elements where the diffraction period is Λ2, and the emission element 38Λ3-1 and the emission element 38Λ3-2 are the Λ3 diffraction elements where the diffraction period is Λ3.

Here, in the optical element 12 according to the embodiment of the present invention, the diffraction period Λ1, the diffraction period Λ2, and the diffraction period Λ3 satisfy a relationship of "Λ1:Λ2:Λ3=1:1/√2±0.015:1/2±0.015". That is, in the optical element 12 according to the embodiment of the present invention, a value obtained by normalizing the diffraction period Λ2 with the diffraction period Λ1 is "1/√2±0.015", and a value obtained by normalizing the diffraction period Λ3 with the diffraction period Λ1 is "1/√2±0.015 (that is, 0.5±0.015)".

In the example shown in the drawing, for example, the diffraction period Λ1 is 580 nm, the diffraction period Λ2 is 410 nm (580/√2), and the diffraction period Λ3 is 290 nm (580/√2)

In addition, in the optical element 12 according to the embodiment of the present invention, in the incidence portion 20 and the emission portion 24, an angle between the periodic direction of the Λ1 diffraction element and the periodic direction of the Λ2 diffraction element and an angle between the periodic direction of the Λ2 diffraction element and the periodic direction of the Λ3 diffraction element are 45°±0.5° or 135°±0.5°.

Accordingly, in the incidence portion 20, an angle between the periodic direction of the incidence element 26Λ1-1 and the incidence element 26Λ1-2 as the Λ1 diffraction elements and the periodic direction of the incidence element 28Λ2-1 and the incidence element 28Λ2-2 as the Λ2 diffraction elements is 45°±0.5° or 135°±0.5°. Further, in the incidence portion 20, an angle between the periodic direction of the incidence element 28Λ2-1 and the incidence element 28Λ2-2 as the Λ2 diffraction elements and the periodic direction of the incidence element 30Λ3-1 and the incidence element 30Λ3-2 as the Λ3 diffraction elements is 45°±0.5° or 135°±0.5°.

On the other hand, in the emission portion 24, an angle between the periodic direction of the emission element 34Λ1-1 and the emission element 34Λ1-2 as the Λ1 diffraction elements and the periodic direction of the emission element 36Λ2-1, the emission element 36Λ2-2, the emission element 36Λ2-3, and the emission element 36Λ2-4 as the Λ2 diffraction elements is 45°±0.5° or 135°±0.5°. Further, in the emission portion 24, an angle between the periodic direction of the emission element 36Λ2-1, the emission element 36Λ2-2, the emission element 36Λ2-3, and the emission element 36Λ2-4 as the Λ2 diffraction elements and a periodic direction of the emission element 38Λ3-1 and the emission element 38Λ3-2 as the Λ3 diffraction elements is 45°±0.5° or 135°±0.5°.

Further, in the optical element 12 according to the embodiment of the present invention, an angle between the periodic direction of the Λ2 diffraction element provided in the incidence portion 20 and the periodic direction of the Λ2 diffraction element provided in the emission portion 24 is any one of 0°±0.5°, 90°±0.5°, 180°±0.5°, or 270°±0.5°. That is, in the optical element 12 according to the embodiment of the present invention, the periodic direction of the Λ2 diffraction element provided in the incidence portion 20 and the periodic direction of the Λ2 diffraction element provided in the emission portion are parallel (substantially parallel) or perpendicular (substantially perpendicular) to each other.

Accordingly, in the optical element 12, an angle between the periodic direction of the incidence element 28Λ2-1 and the incidence element 28Λ2-2 in the incidence portion 20 and the periodic direction of the emission element 36Λ2-1, the emission element 36Λ2-2, the emission element 36Λ2-3, and the emission element 36Λ2-4 in the emission portion 24 is any one of 0°±0.5°, 90°±0.5°, 180°±0.5°, or 270°±0.5°.

For example, the right direction on the plane of FIG. 2 is 0°, and the upper direction on the plane of FIG. 2 is 90°. FIG. 2 is a plan view in a case where the optical element 12 is seen from the observation direction of the user U.

In FIG. 2, the periodic direction of the Λ1 diffraction element is indicated by a solid line arrow, the periodic direction of the Λ2 diffraction element is indicated by a broken line arrow, and the periodic direction of the Λ3 diffraction element is indicated by a fine broken line arrow.

Further, in FIG. 2, the diffraction period Λ1 (580 nm), the diffraction period Λ2 (410 nm), and the diffraction period Λ3 (280 nm) are inverted and represented by the lengths of the arrows. That is, the arrow of the Λ1 diffraction element indicated by the solid line is the shortest, and the arrow of the Λ3 diffraction element indicated by the fine broken line is the longest.

Figure 14:
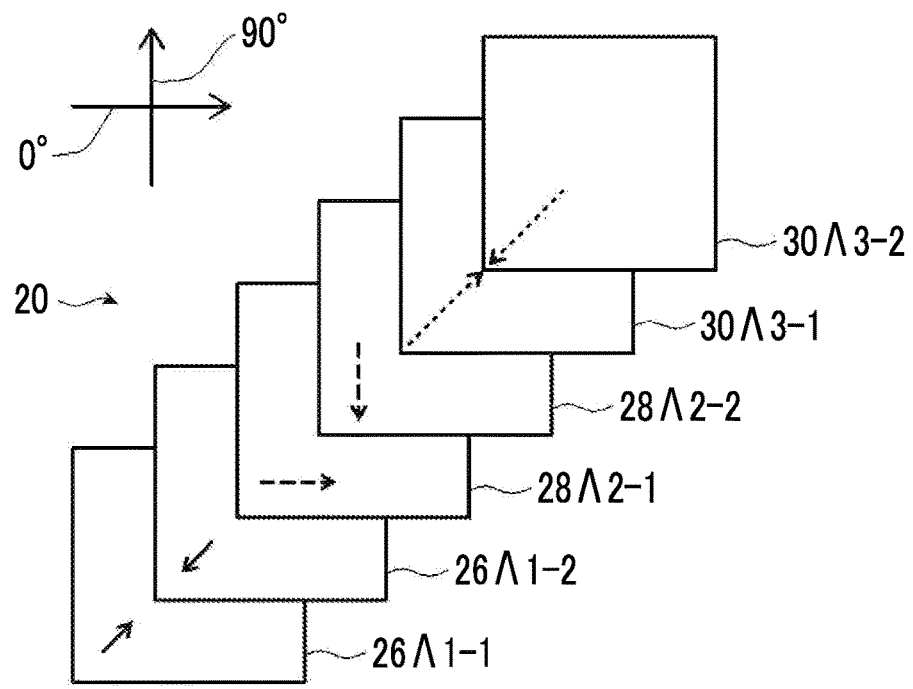
FIG. 14 is a conceptual diagram showing an incidence portion of the optical element shown in FIG. 1.

As conceptually shown in FIGS. 2 and 14, in the incidence portion 20 of the optical element 12 in the example shown in the drawing, the periodic direction of the incidence element 26Λ1-1 as the Λ1 diffraction element (solid line) is 45°, and the periodic direction of the incidence element 26Λ1-2 is 225°. In addition, the periodic direction of the incidence element 28Λ2-1 as the Λ2 diffraction element (broken line) is 0°, and the periodic direction of the incidence element 28Λ2-2 is 270°. Further, the periodic direction of the incidence element 30Λ3-1 as the Λ3 diffraction element (fine broken line) is 45°, and the periodic direction of the incidence element 30Λ3-2 is 225°. In FIG. 1, the arrow indicating the periodic direction of each of the incidence elements is represented by the reference numeral of the corresponding incidence element. Regarding this point, the same can also be applied to the emission element.

Figure 15:
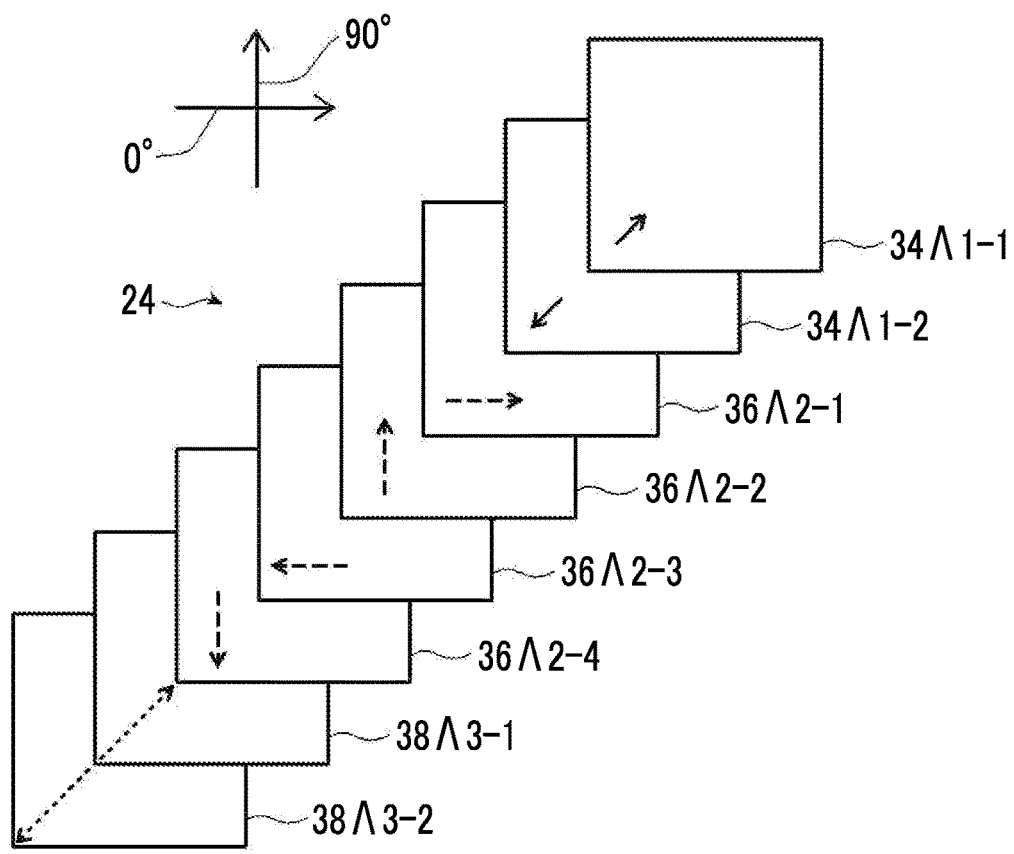
FIG. 15 is a conceptual diagram showing an emission portion of the optical element shown in FIG. 1.

On the other hand, as conceptually shown in FIGS. 2 and 15, in the emission portion 24 of the optical element 12 in the example shown in the drawing, the periodic direction of the emission element 34Λ1-1 as the Λ1 diffraction element (solid line) is 45°, and the periodic direction of the emission element 34Λ1-2 is 225°. In addition, the periodic direction of the emission element 36Λ2-1 as the Λ2 diffraction element (broken line) is 0°, the periodic direction of the emission element 36Λ2-2 is 90°, the periodic direction of the emission element 36Λ2-3 is 180°, and the periodic direction of the emission element 36Λ2-4 is 270°. Further, the periodic direction of the emission element 38Λ3-1 as the Λ3 diffraction element (fine broken line) is 45°, and the periodic direction of the emission element 38Λ3-2 is 225°.

With the above-described configuration, in a case where the optical element 12 and the image display apparatus according to the embodiment of the present invention is used, for example, for AR glasses, the FOV can be widened by one light guide plate without occurrence of crosstalk.

In AR glasses or the like, in order to widen the FOV, it is necessary that light that carries and supports an image displayed (emitted) by the display 14 is incident into the light guide plate 18, is totally reflected, and propagates in the light guide plate 18 according to the entire surface of the display screen of the display 14.

However, the image that is displayed by the display 14 and incident into the incidence portion is incident from various angles depending on the positions of the display screen of the display. It is difficult to allow the light incident from various angles to be incident into the light guide plate at an angle where total reflection occurs according to the entire display screen of the display.

In addition, in AR glasses or the like, in order to widen the FOV, in the emission portion 24, it is necessary that the light propagating in the light guide plate 18 is emitted from the entire surface at various angles.

However, it is also difficult that all of the light components that are totally reflected and propagate are diffracted at angles where they can be emitted and emitted at various directions.

Accordingly, in the optical element 12 according to the embodiment of the present invention, both of the incidence portion 20 and the emission portion 24 include, as the incidence elements and the emission elements, three kinds of diffraction elements having different diffraction periods Λ that include the Λ1 diffraction element where the diffraction period is Λ1, the Λ2 diffraction element where the diffraction period is Λ2, and the Λ3 diffraction element where the diffraction period is Λ3.

As described above, the liquid crystal layer 54 (cholesteric liquid crystal layer) having the liquid crystal alignment pattern where the direction of the optical axis 40A of the liquid crystal compound 40 changes while continuously changing in the one in-plane direction (periodic direction) acts as the liquid crystal diffraction element and diffracts and reflects incidence light in a direction different from specular reflection. Regarding the diffraction of the light, as the diffraction period Λ decreases, the light is largely diffracted and reflected.

Therefore, in the optical element 12 according to the embodiment of the present invention, even in a case where light is incident from the display 14 into the incidence portion 20 at various angles, any incidence element of the incidence element 26Λ1-1 and the incidence element 26Λ1-2 as the Λ1 diffraction elements, the incidence element 28Λ2-1 and the incidence element 28Λ2-2 as the Λ2 diffraction elements, and the incidence element 30Λ3-1 and the incidence element 30Λ3-2 as the Λ3 diffraction elements can cause light to be incident into the light guide plate 18 at an angle where the light can be totally reflected and propagate.

Accordingly, in the optical element 12 according to the embodiment of the present invention, the light that is displayed by the display 14 and incident into the incidence portion 20 can be incident into the light guide plate 18 at angle where the light can be totally reflected and propagate according to the entire surface of the display screen of the display 14.

In addition, the incidence portion 20 includes the three diffraction elements having different diffraction periods Λ. Therefore, light is totally reflected and propagates in the light guide plate 18 at various angles in various directions.

Further, as in the incidence portion 20, the emission portion 24 also includes the three kinds of diffraction elements including the Λ1 diffraction element, the Λ2 diffraction element, and the Λ3 diffraction element having different diffraction periods Λ as the emission elements. Further, the diffraction periods of the diffraction elements are the same as those of the incidence portion 20. Therefore, the light that propagates at various angles in various directions and is incident into the emission portion 24 can be emitted from light guide plate 18 to various directions using the entire surface of the emission portion 24 without leaking.

That is, in the optical element 12 and the image display apparatus 10 according to the embodiment of the present invention, light from the entire surface of the display screen of the display 14 can be incident into the light guide plate 18 and propagate in the light guide plate 18 by the incidence portion 20, and light from the entire surface of the display screen of the display 14 can be emitted from the light guide plate 18 at various angles by the emission portion 24.

Therefore, in the present invention, the FOV can be widened in AR glasses or the like.

Here, as described above, in AR glasses having a wide FOV and AR glasses including one light guide plate 18, crosstalk is likely to occur.

On the other hand, in the optical element 12 according to the embodiment of the present invention, the diffraction period Λ1, the diffraction period Λ2, and the diffraction period Λ3 in the diffraction elements forming the incidence elements and the emission elements satisfy a relationship of "Λ1:Λ2:Λ3=1:1/√2±0.015:1/2±0.015".

The optical element 12 according to the embodiment of the present invention satisfies this relationship such that the occurrence of crosstalk can be suppressed.

Specifically, in the optical element 12 in the example shown in the drawing, the light that is diffracted by the incidence element 26Λ1-1 and the incidence element 26Λ1-2 as the Λ1 diffraction elements, is incident into the light guide plate 18, and propagates in the light guide plate 18 is diffracted by the emission element 34Λ1-1 and the emission element 34Λ1-2 as the Λ1 diffraction elements, and is emitted from the light guide plate 18.

the light that is diffracted by the incidence element 28Λ2-1 and the incidence element 28Λ2-2 as the Λ2 diffraction elements, is incident into the light guide plate 18, and propagates in the light guide plate 18 is diffracted by the emission element 36Λ2-1, the emission element 36Λ2-2, the emission element 36Λ2-3, and the emission element 36Λ2-4 as the Λ2 diffraction elements, and is emitted from the light guide plate 18.

Further, the light that is diffracted by the incidence element 30Λ3-1 and the incidence element 30Λ3-2 as the Λ3 diffraction elements, is incident into the light guide plate 18, and propagates in the light guide plate 18 is diffracted by the emission element 38Λ3-1 and the emission element 38Λ3-2 as the Λ3 diffraction elements, and is emitted from the light guide plate 18.

Further, in the optical element 12 according to the embodiment of the present invention, in the incidence portion 20 and the emission portion 24, an angle between the periodic direction of the Λ1 diffraction element and the periodic direction of the Λ2 diffraction element and an angle between the periodic direction of the Λ2 diffraction element and the periodic direction of the Λ3 diffraction element are 45°±0.5° or 135°±0.5°.

Further, in the optical element 12 according to the embodiment of the present invention, an angle between the periodic direction of the Λ2 diffraction element among the incidence elements provided in the incidence portion 20 and the periodic direction of the Λ2 diffraction element among the emission elements provided in the emission portion 24 is any one of 0°±0.5°, 90°±0.5°, 180°±0.5°, or 270°±0.5°.

In the optical element 12 according to the embodiment of the present invention, with the above-described configuration, the relationship of the incidence directions in which the incidence elements having the diffraction periods in the incidence portion 20 cause light to be incident into the light guide plate 18, the relationship of the emission directions where the emission elements having the diffraction periods in the emission portion 24 emit light from the light guide plate 18, and the relationship between the incidence direction in which the incidence portion 20 causes light to be incident into the light guide plate 18 and the emission direction in which the emission portion 24 emits light from the light guide plate can be appropriately maintained.

By satisfying both of the conditions, even in a case where the FOV is widened by one light guide plate 18, crosstalk can be prevented.

That is, in the optical element 12 according to the embodiment of the present invention and the image display apparatus according to the embodiment of the present invention including the optical element 12 according to the embodiment of the present invention, for example, in AR glasses or the like, the FOV can be widened, crosstalk can be prevented, and an appropriate image can be displayed using one light guide plate.

In the optical element 12 according to the embodiment of the present invention, in a case where the diffraction periods A of the incidence elements provided in the incidence portion 20 and the emission elements provided in the emission portion 24 are two or more kinds, the FOV cannot be sufficiently widened.

In addition, in the optical element 12 according to the embodiment of the present invention, in a case where the diffraction periods A of the diffraction elements forming the incidence portion 20 and the emission portion 24 did not satisfy a relationship of "Λ1:Λ2:Λ3=1:1/√2±0.015:1/2±0.015", the relationship of the combination of the incidence elements and the emission elements is collapsed, crosstalk occurs, and an appropriate image can be displayed.

In the optical element 12 according to the embodiment of the present invention, it is preferable that the diffraction periods A of the incidence elements of the incidence portion 20 and the emission elements of the emission portion 24 satisfy "Λ1:Λ2:Λ3=1:1/√2±0.005:1/√2±0.005", it is more preferable that the diffraction periods A the satisfy "Λ1:Λ2:Λ3=1:1/√2±0.001:1/√2±0.001", and it is still more preferable that the diffraction periods A the satisfy "Λ1:Λ2:Λ3=1:1/√2:1/2".

Optionally, in the optical element 12 according to the embodiment of the present invention, both of the incidence portion 20 and the emission portion 24 may include incidence elements and emission elements (diffraction elements) having diffraction periods other than Λ1, Λ2, and Λ3. Here, in this case, it is necessary that diffraction periods of the incidence elements and the emission elements having diffraction periods other than Λ1, Λ2, and Λ3 are integer multiples of the diffraction period Λ2 or the diffraction period Λ3, for example, "1:2/√2" where the diffraction period Λ1 is 1.

In the optical element 12 according to the embodiment of the present invention, the diffraction period Λ1 is not limited. That is, the diffraction period Λ1 may be appropriately set depending on the color of the image displayed by the image display apparatus according to the embodiment of the present invention, whether or not the display image of the image display apparatus according to the embodiment of the present invention is a monochrome image, a two-color image, or a full-color image, the aspect ratio of the FOV, and the like.

The diffraction period Λ1 is preferably 300 to 700 nm, more preferably 400 to 600 nm, still more preferably 450 to 500 nm, and still more preferably 460 to 490 nm.

It is preferable that the diffraction period Λ1 to be 300 to 700 nm from the viewpoints that, for example, any one of red light, green light, or blue light can be caused to be appropriately incident into the light guide plate 18 and to be emitted from the light guide plate 18 and the range of the incidence angle can be widened.

Further, in the optical element 12 according to the embodiment of the present invention, in the incidence elements of the incidence portion 20 and the emission elements of the emission portion 24, an angle between the periodic direction of the Λ1 diffraction element and the periodic direction of the Λ2 diffraction element and an angle between the periodic direction of the Λ2 diffraction element and the periodic direction of the Λ3 diffraction element are 45°±0.5° or 135°±0.5°.

In a case where the angle between the periodic directions of the Λ1 diffraction element and the Λ2 diffraction element and the angle between the periodic directions of the Λ2 diffraction element and the Λ3 diffraction element exceed 45°±0.5° or 135°±0.5°, crosstalk occurs.

The angle between the periodic directions of the Λ1 diffraction element and the Λ2 diffraction element and the angle between the periodic directions of the Λ2 diffraction element and the Λ3 diffraction element are preferably 45°±0.2° or 135°±0.2°, more preferably 45° 0.1° or 135°±0.1°, and most preferably 45° or 135°.

Further, in the optical element 12 according to the embodiment of the present invention, an angle between the periodic direction of the Λ2 diffraction element among the incidence elements provided in the incidence portion 20 and the periodic direction of the Λ2 diffraction element among the emission elements provided in the emission portion 24 is any one of 0°±0.5°, 90°±0.5°, 180°±0.5°, or 270°±0.5°. That is, in the incidence portion 20 and the emission portion 24, the periodic directions of the Λ2 diffraction elements are parallel (substantially parallel) or perpendicular (substantially perpendicular) to each other.

In the incidence portion 20 and the emission portion 24, in a case where the angle between the periodic directions of the Λ2 diffraction elements exceed 0°±0.5°, 90°±0.5°, 180°±0.5°, or 270°±0.5°, crosstalk occurs.

The angle between the periodic directions of the Λ2 diffraction elements of the incidence portion 20 and the emission portion 24 is preferably any one of 0°±0.2°±90°±0.2°, 180°±0.2°, or 270°±0.2°, more preferably any one of 0°±0.1°, 90°±0.1°, 180°±0.1°, or 270°±0.1°, and still more preferably any one of 0°, 90°, 180°, or 270°.

In the optical element 12 according to the embodiment of the present invention, the incidence portion 20 includes 6 or more incidence elements, and the emission portion 24 includes 8 or more emission elements.

In a case where the incidence portion 20 includes 6 or more incidence elements, incidence elements having the same diffraction period Λ and different periodic directions can be disposed as all of the incidence elements of the incidence portion 20 including the Λ1 diffraction element, the Λ2 diffraction element, and the Λ3 diffraction element.

Likewise, in a case where the emission portion 24 includes 8 or more emission elements, emission elements having different periodic directions can be disposed as all of the emission elements of the emission portion 24 including the Λ1 diffraction element, the Λ2 diffraction element, and the Λ3 diffraction element. In addition, in the emission portion 24, emission elements having different periodic directions can be disposed as all of the three kinds of emission elements having different diffraction periods, and four incidence elements having the same diffraction period and different periodic directions can be disposed as one kind among diffraction elements having different diffraction periods. Alternatively, in the emission portion 24, emission elements having different periodic directions can be disposed as all of the three kinds of emission elements having different diffraction periods, and three incidence elements having the same diffraction period and different periodic directions can be disposed as two kinds among diffraction elements having different diffraction periods.

As described above, the liquid crystal layer 54 (liquid crystal diffraction element) having the liquid crystal alignment pattern where the optical axis 40A of the liquid crystal compound 40 rotates in the one in-plane direction refracts light in the direction in which the optical axis 40A rotates, that is, the periodic direction (arrangement axis D direction).

Accordingly, the incidence portion 20 includes one or more incidence elements as the Λ1 diffraction element, the Λ2 diffraction element, and the Λ3 diffraction element, the emission portion 24 includes a plurality of emission elements as all of the Λ1 diffraction element, the Λ2 diffraction element, and the Λ3 diffraction element, and the periodic directions of the diffraction elements having the diffraction periods are changed such that the diffraction directions of light by the diffraction elements having the diffraction periods Λ can be made to be two different directions.

As a result, in the incidence portion 20, light can be refracted in a wider direction to be incident into the light guide plate 18 and to two-dimensionally propagate more widely. In addition, in the emission portion 24, light can be refracted in a wider direction to be emitted from the light guide plate 18 and to be two-dimensionally emitted more widely.

Therefore, in the image display apparatus 10 according to the embodiment of the present invention including the optical element 12 according to the embodiment of the present invention, using one light guide plate 18, crosstalk can be prevented, the FOV can be widened, and an excellent eye box (viewing zone) can also be secured.

In the optical element 12 according to the embodiment of the present invention, the number of the incidence elements provided in the incidence portion 20 may be 6 or more and is preferably 8 or more. It is preferable that the number of the incidence elements provided in the incidence portion 20 is 8 or more from the viewpoints, for example, in a case where a plurality of diffraction elements are provided as all of the Λ1 diffraction element, the Λ2 diffraction element, and the Λ3 diffraction element, the number of the diffraction elements can be made to be 3 or more, the FOV can be further widened, and the eye box can be widened.

In addition, the number of the incidence elements provided in the incidence portion 20 is not limited and is preferably 12 or less.

On the other hand, the number of the emission elements provided in the emission portion 24 may be 8 or more and is preferably 10 or more and more preferably 12 or more. It is preferable that the number of the emission elements provided in the emission portion 24 is 10 or more from the viewpoints that, for example, the FOV can be widened and the eye box can be widened.

In addition, the number of the emission elements provided in the emission portion 24 is not limited and is preferably 15 or less.

In the incidence portion 20 and the emission portion 24, in a case where a plurality of diffraction elements are provided as one or more of the Λ1 diffraction element, the Λ2 diffraction element, and the Λ3 diffraction element, in the incidence portion 20 and the emission portion 24, an angle between the periodic directions of the Λ1 diffraction elements, an angle between the periodic directions of the Λ2 diffraction elements, and an angle between the periodic directions of the Λ3 diffraction elements are not limited.

In a case where the incidence portion 20 and the emission portion 24 include a plurality of diffraction elements as the Λ1 diffraction element and/or the Λ3 diffraction element, it is preferable that a combination of diffraction elements are provided such that an angle between the periodic directions of the Λ1 diffraction elements and an angle between the periodic directions of the Λ3 diffraction elements are 180°±0.5°.

That is, it is preferable that the incidence portion 20 and the emission portion 24 include a combination of the Λ1 diffraction elements and/or the Λ3 diffraction elements having opposite periodic directions. In a case where turning directions of circularly polarized light to be selectively reflected by the diffraction elements are opposite to each other, it is preferable that the incidence portion 20 and the emission portion 24 include a combination of the Λ1 diffraction elements and/or the Λ3 diffraction elements having the same periodic direction.

As a result, the FOV can be further widened.

In a case where the incidence portion 20 and the emission portion 24 include three or more diffraction elements as the Λ1 diffraction element and/or the Λ3 diffraction element, it is preferable that in addition to the above-described combination, a combination of diffraction elements are provided such that an angle between the periodic directions of the Λ1 diffraction elements and an angle between the periodic directions of the Λ3 diffraction elements are 90°±0.5°. That is, it is preferable that the incidence portion 20 and the emission portion 24 include a combination of the Λ1 diffraction elements and/or the Λ3 diffraction elements having periodic directions perpendicular to each other.

In addition, due to the same reason, in a case where the incidence portion 20 and the emission portion 24 include a plurality of Λ2 diffraction elements, it is preferable that the incidence portion 20 and the emission portion 24 include a combination of Λ2 diffraction elements such that an angle between the periodic directions of the Λ2 diffraction elements is 90°±0.5°. It is preferable that the incidence portion 20 and the emission portion 24 include a combination of Λ2 diffraction elements such that the periodic directions of the Λ2 diffraction elements are perpendicular to each other.

In particular, in a case where the periodic direction of one Λ2 diffraction element is 0°, the emission portion 24 includes, in addition to the Λ2 diffraction element where the periodic direction is 0°, the Λ2 diffraction element where the periodic direction is 90°±0.5°, the Λ2 diffraction element where the periodic direction is 180°±0.5°, and the Λ2 diffraction element where the periodic direction is 270°±0.5°.

In the optical element according to the embodiment of the present invention, in a case where any one of the incidence portion 20 or the emission portion 24 includes a plurality of diffraction elements having the same diffraction period Λ, it is preferable that the periodic directions of the diffraction elements having the same diffraction period Λ are different from each other.

However, in the incidence portion 20 and the emission portion 24, optionally, the diffraction elements having the same diffraction period where the periodic directions match each other may be present, for example, in order to improve the reflectivity.

In the optical element 12 in the example shown in the drawing, both of the incidence elements of the incidence portion 20 and the emission elements of the emission portion 24 are reflective liquid crystal diffraction elements including the liquid crystal layer 54 (cholesteric liquid crystal layer (liquid crystal diffraction layer)).

In the Λ1 diffraction element, the Λ2 diffraction element, and the Λ3 diffraction element of the incidence portion 20 and the emission portion 24, the wavelength ranges (helical pitches P) where the liquid crystal layers 54 selectively reflect light may be all the same, may be all different, or may be partially the same and partially different.

In addition, for example, in a case where the incidence portion 20 includes two incidence elements where the diffraction periods are Λ1 and the selective reflection wavelength ranges are different, the incidence portion 20 and/or the emission portion 24 may include the diffraction elements where the selective reflection wavelength ranges may be different between the Λ1 diffraction elements, between Λ2 diffraction elements, and between the Λ3 diffraction elements.

In this case, between the Λ1 diffraction elements, between Λ2 diffraction elements, and between the Λ3 diffraction elements in the incidence portion 20 and the emission portion 24, the wavelength ranges where the liquid crystal layers 54 selectively reflect light overlap each other by preferably 100 nm or more, more preferably 150 nm or more, and still more preferably in the entire range.

In addition, as described above, the liquid crystal layer 54 as the cholesteric liquid crystal layer selectively reflects right circularly polarized light or left circularly polarized light.

The diffraction elements provided in the incidence portion 20 and the emission portion 24 may all selectively reflect circularly polarized light having the same turning direction or may selectively reflect circularly polarized light components having different turning directions.

In addition, in a case where the incidence portion 20 and/or the emission portion 24 includes diffraction elements having different turning directions of circularly polarized light components to be selectively reflected, for example, the incidence portion 20 and/or the emission portion 24 may include diffraction elements having the same diffraction period and different turning directions of circularly polarized light components to be selectively reflected. Alternatively, the diffraction elements having the same diffraction period may selectively reflect circularly polarized light components having the same turning direction, and the turning directions of circularly polarized light components to be selectively reflected may be different between the diffraction elements having different diffraction periods.

In the above-described example, the liquid crystal diffraction element is used as the diffraction element used in the incidence portion and the emission portion. In the optical element according to the embodiment of the present invention, the diffraction element is not limited to the liquid crystal diffraction element, and all of the well-known diffraction elements used in AR glasses or the like can be used.

Examples of the diffraction element that can be used include a hologram diffraction element, a surface relief diffraction element, and a holographic polymer dispersed liquid crystal (HPDLC).

The periodic directions and the diffraction periods (diffraction grating periods) in the diffraction elements may be set using a well-known method depending on the diffraction elements (diffraction gratings).

In the optical element 12 shown in FIGS. 1 and 2, the incidence portion 20 is provided in the vicinity of one corner portion of the rectangular light guide plate 18, and the emission portion 24 may be provided to cover the remaining region of the light guide plate 18. However, the optical element according to the embodiment of the present invention is no limited to this configuration.

The optical element according to the embodiment of the present invention may adopt a well-known configuration used in AR glasses or the like, for example, a configuration where the incidence portion is provided at the center in the vicinity of an end part of one side of the rectangular light guide plate and the emission portion is provided to cover the remaining region of the light guide plate or a configuration where the incidence portion is provided in the vicinity of one end part of the elongated light guide plate and the emission portion is provided in the vicinity of another end part of the light guide plate.

In the optical element 12 shown in FIGS. 1 and 2, in a preferable aspect, all of the diffraction elements (the incidence elements and the emission elements) are laminated in both of the incidence portion 20 and the emission portion 24. That is, the incidence elements of the incidence portion 20 are disposed at the same position of the light guide plate 18 in the plane direction, and the emission elements of the emission portion 24 are disposed at the same position of the light guide plate 18 in the plane direction.

However, the present invention is not limited to this configuration. In the incidence portion 20 and/or the emission portion 24, the diffraction elements forming the incidence portion 20 and/or the emission portion may be disposed at different positions of the light guide plate 18 in the plane direction (in a plane) without being laminated. In addition, in this case, the diffraction elements that are laminated and the diffraction elements that are disposed at different positions in the plane direction without being laminated may be mixed.

In this case, the disposition of the diffraction elements is not limited and may be appropriately set to display an appropriate image depending on the size of the screen of the display 14, the position of the display 14 relative to the light guide plate 18, the size of AR glasses, and the like.

Further, in the present invention, the incidence portion 20 and the emission portion 24 are not limited to the configuration where they are disposed on different main surfaces of the light guide plate 18. The incidence portion 20 and the emission portion 24 may be disposed at different positions on the same main surface of the light guide plate 18 in the plane direction.

Hereinabove, the optical element and the image display apparatus according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

<Preparation of Liquid Crystal Diffraction Element 1>
(Formation of Alignment Film)

A glass substrate was used as the support.

The following coating liquid for forming an alignment film was applied to the support using a spin coater at 2500 rpm for 30 seconds. The support on which the coating film of the coating liquid for forming an alignment film was formed was dried using a hot plate at 60° C. for 60 seconds. As a result, an alignment film was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

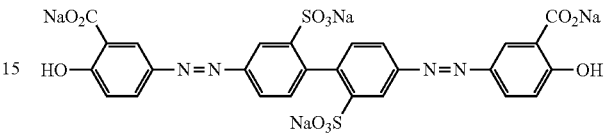

(Exposure of Alignment Film)

The alignment film was exposed using the exposure device shown in FIG. 9 to form an alignment film P-1 having an alignment pattern.

In the exposure device, a laser that emits laser light having a wavelength (355 nm) was used as the laser. The exposure amount of the interference light was 3000 mJ/cm². An intersecting angle (intersecting angle α) between the two laser beams was adjusted such that the diffraction period Λ(the length over which the optical axis rotates by 180°) of an alignment pattern formed by interference of two laser beams was 0.490 m.

(Formation of Cholesteric Liquid Crystal Layer)

As the liquid crystal composition forming the cholesteric liquid crystal layer, the following liquid crystal composition LC-1 was prepared.

Liquid Crystal Composition LC-1

| | |
|---|---|
| Liquid crystal compound L-1 | 100.00 parts by mass |
| Polymerization initiator (KAYACURE DETX-S, manufactured by Nippon Kayaku Co., Ltd.) | 1.00 part by mass |
| Chiral agent Ch-1 | 4.00 parts by mass |
| Methyl ethyl ketone | 142.06 parts by mass |

Liquid Crystal Compound L-1

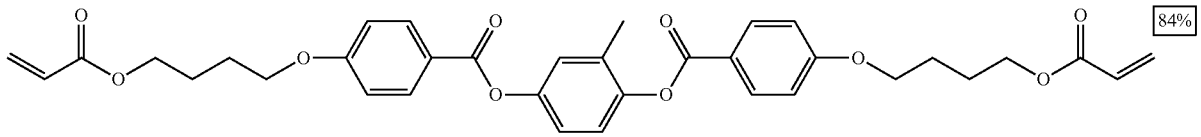

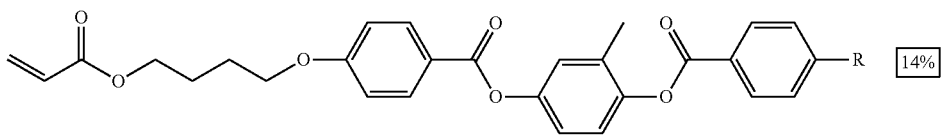

-continued

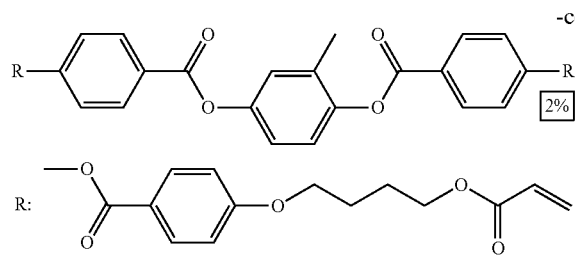

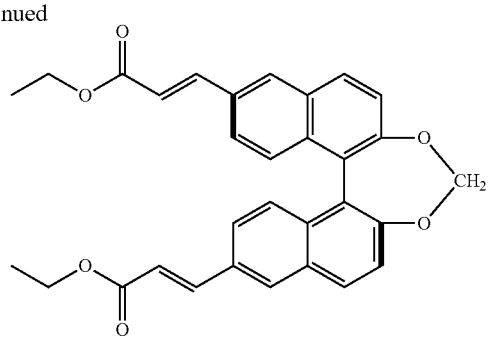

Chiral Agent Ch-1

This chiral agent Ch-1 is a chiral agent that forms a right-handed helix (dextrorotation).

The above-described liquid crystal composition LC-1 was applied to the alignment film P-1 using a spin coater. Here, the thickness of the formed film was adjusted to 10 μm.

The coating film of the liquid crystal composition LC-1 was heated on a hot plate at 80° C. for 3 minutes (180 sec).

Next, the coating film was irradiated with ultraviolet light having a wavelength of 365 nm at 80° C. at an irradiation dose of 300 mJ/cm² using a high-pressure mercury lamp in a nitrogen atmosphere. As a result, the liquid crystal composition LC-1 was cured, the alignment of the liquid crystal compound was immobilized, and a cholesteric liquid crystal layer was formed (first exposure step).

Thus, a liquid crystal diffraction element including the support, the alignment film, and the cholesteric liquid crystal layer shown in FIG. 3 was prepared.

The liquid crystal diffraction element was cut in a direction along the rotation direction of the optical axis of the liquid crystal compound, that is the periodic direction, and a cross-section in the thickness direction was observed with an SEM. By analyzing the SEM image, the thickness of the cholesteric liquid crystal layer, the diffraction period Λ (the single period A of the liquid crystal alignment pattern), and the length (helical pitch P) of one helical pitch in the cholesteric liquid crystalline phase were measured.

<Preparation of Liquid Crystal Diffraction Elements 2 to 24>

Liquid crystal diffraction elements were prepared and the same measurement was performed using the same method as that of Example 1, except that the intersecting angle α (diffraction period Λ) during the exposure of the alignment film P-1, the composition of the liquid crystal composition, the coating film thickness of the liquid crystal composition, and the exposure conditions of the liquid crystal composition were changed as shown in Table 1.

Regarding the exposure of the liquid crystal composition, only the first exposure step was performed in some examples, and the second exposure step was also performed after the first exposure step in some examples. In a case where the exposure was performed twice, the HTP of the chiral agent was changed to adjust the helical pitch of the cholesteric liquid crystalline phase mainly in the first exposure step, and the liquid crystal composition was cured mainly in the second exposure step.

Next, the liquid crystal composition was exposed to light having a wavelength of 315 nm using a high-pressure mercury lamp through a long pass filter of 300 nm and a short pass filter of 350 nm.

In addition, in a case where a shape where the helical pitch P continuously increased in the thickness direction was seen during the SEM observation of the cross-section of the liquid crystal diffraction element, the helical pitch P was measured at two positions including a position in the vicinity of the interface side with the alignment film and a position on the air interface side with the liquid crystal diffraction element to obtain a range of the helical pitch P.

TABLE 1

| Liquid Crystal Diffraction Element | | | #1 | #2 | #3 | #4 | #5 | #6 | #7 | #8 |
|---|---|---|---|---|---|---|---|---|---|---|
| Alignment Film | Exposure Step | Intersecting Angle α [deg.] | 17.81 | 25.69 | 37.78 | 17.81 | 25.69 | 37.78 | 17.67 | 25.37 |
| | | Diffraction Period Λ [nm] | 580 | 410 | 290 | 580 | 410 | 290 | 585 | 414 |
| Liquid Crystal Layer | Composition | Chiral Agent [Part(s) by Mass] | 3.3 | 4 | 5 | 3.3 | 4 | 5 | 3.3 | 4 |
| | | Concentration of Solid Contents [mass %] | 42.5 | 42.5 | 42.5 | 10 | 10 | 10 | 42.5 | 42.5 |
| | First Exposure Step | Exposure Wavelength [nm] | 365 | 315 | 315 | 365 | 315 | 315 | 365 | 315 |
| | | Temperature [° C.]/ Irradiation Dose [mJ/cm²] | 80/300 | 100/100 | 80/200 | 80/300 | 100/100 | 80/200 | 80/300 | 100/100 |
| | Second Exposure Step | Exposure Wavelength [nm] | — | 365 | 365 | — | 365 | 365 | — | 365 |
| | | Temperature [° C.]/ Irradiation Dose [mJ/cm²] | — | 100/1000 | 80/1000 | — | 100/1000 | 80/1000 | — | 100/1000 |
| | | Film Thickness [μm] | 10 | 10 | 10 | 1 | 1 | 1 | 10 | 10 |
| | | Helical Pitch P [nm] | 560 | 290-440 | 280-490 | 560 | 290-440 | 280-490 | 560 | 290-440 |

TABLE 1-continued

| Liquid Crystal Diffraction Element | | | #9 | #10 | #11 | #12 | #13 | #14 | #15 | #16 |
|---|---|---|---|---|---|---|---|---|---|---|
| Alignment Film | Exposure Step | Intersecting Angle α [deg.] | 37.27 | 17.67 | 25.37 | 37.27 | 17.51 | 25.22 | 36.96 | 17.51 |
| | | Diffraction Period Λ [nm] | 293 | 585 | 414 | 293 | 590 | 417 | 295 | 590 |
| Liquid Crystal Layer | Composition | Chiral Agent [Part(s) by Mass] | 5 | 3.3 | 4 | 5 | 3.3 | 4 | 5 | 3.3 |
| | | Concentration of Solid Contents [mass %] | 42.5 | 10 | 10 | 10 | 42.5 | 42.5 | 42.5 | 10 |
| | First Exposure Step | Exposure Wavelength [nm] | 315 | 365 | 315 | 315 | 365 | 315 | 315 | 365 |
| | | Temperature [° C.]/ Irradiation Dose [mJ/cm²] | 80/200 | 80/300 | 100/100 | 80/200 | 80/300 | 100/100 | 80/200 | 80/300 |
| | Second Exposure Step | Exposure Wavelength [nm] | 365 | — | 365 | 365 | — | 365 | 365 | — |
| | | Temperature [° C.]/ Irradiation Dose [mJ/cm²] | 80/1000 | — | 100/1000 | 80/1000 | — | 100/1000 | 80/1000 | — |
| | | Film Thickness [μm] | 10 | 1 | 1 | 1 | 10 | 10 | 10 | 1 |
| | | Helical Pitch P [nm] | 280-495 | 560 | 290-440 | 280-495 | 560 | 290-440 | 285-495 | 560 |

| Liquid Crystal Diffraction Element | | | #17 | #18 | #19 | #20 | #21 | #22 | #23 | #24 |
|---|---|---|---|---|---|---|---|---|---|---|
| Alignment Film | Exposure Step | Intersecting Angle α [deg.] | 25.22 | 36.96 | 21.69 | 31.58 | 21.69 | 31.58 | 36.34 | 36.34 |
| | | Diffraction Period Λ [nm] | 417 | 295 | 480 | 339 | 480 | 339 | 300 | 300 |
| Liquid Crystal Layer | Composition | Chiral Agent [Part(s) by Mass] | 4 | 5 | 4 | 5 | 4 | 5 | 5 | 5 |
| | | Concentration of Solid Contents [mass %] | 10 | 10 | 42.5 | 42.5 | 10 | 10 | 42.5 | 10 |
| | First Exposure Step | Exposure Wavelength [nm] | 315 | 315 | 315 | 315 | 315 | 315 | 315 | 315 |
| | | Temperature [° C.]/ Irradiation Dose [mJ/cm²] | 100/100 | 80/200 | 80/200 | 80/200 | 80/200 | 80/200 | 80/200 | 80/200 |
| | Second Exposure Step | Exposure Wavelength [nm] | 365 | 365 | 365 | 365 | 365 | 365 | 365 | 365 |
| | | Temperature [° C.]/ Irradiation Dose [mJ/cm²] | 100/1000 | 80/1000 | 80/1000 | 80/1000 | 80/1000 | 80/1000 | 80/1000 | 80/1000 |
| | | Film Thickness [μm] | 1 | 1 | 10 | 10 | 1 | 1 | 10 | 1 |
| | | Helical Pitch P [nm] | 290-440 | 285-495 | 330-515 | 290-545 | 330-515 | 290-545 | 285-500 | 285-500 |

Example 1

(Application to AR Glasses)

The support and the alignment film were peeled off from each of the liquid crystal diffraction elements #1 to #6 prepared as described above, and the cholesteric liquid crystal layer was transferred to the light guide plate to obtain the configuration shown in Table 2. As a result, optical elements were prepared as shown in FIGS. 1 and 2.

The cholesteric liquid crystal layers in the incidence portion and the emission portion were laminated, for example, through the following procedure.

(1) A temporary support was bonded to the cholesteric liquid crystal layer side of the liquid crystal diffraction element including the support, the alignment film, and the cholesteric liquid crystal layer to be laminated. In this example, as the temporary support, MASTACK AS3-304 manufactured by Fujimori Kogyo Co., Ltd. was used.

(2) The support and the alignment film present from the step of preparing the cholesteric liquid crystal layer were peeled off to expose the interface of the cholesteric liquid crystal layer on the alignment film side.

(3) A silicon oxide layer (SiOx layer) was formed on both of the interface of the cholesteric liquid crystal layer on the alignment film side and the interface of the cholesteric liquid crystal layer on the air side as the lamination side. A method of forming the silicon oxide layer is not limited and, for example, vacuum deposition is preferably used. In this example, the formation of the silicon oxide layer was performed using a vapor deposition device (model number: ULEYES) manufactured by ULVAC, Inc. As a vapor deposition source, SiO₂ powder was used. The thickness of the silicon oxide layer is not limited and is preferably 50 nm or less. In this example, the thickness of the silicon oxide layer was 50 nm or less.

(4) Next, after bonding the formed silicon oxide layers at 120° C., the temporary support was peeled off.

Through the steps (1) to (4), a diffraction element where the two cholesteric liquid crystal layers are laminated can be prepared. In addition, by repeating the steps (1) to (4), a diffraction element where three or four or more cholesteric liquid crystal layers are laminated can be prepared.

The periodic direction in the diffraction structure of each of the cholesteric liquid crystal layers (diffraction elements) may be set, for example, by putting a mark representing the periodic direction on the support on the lamination side and the temporary support on the lamination side in advance and using the marks during the lamination. The mark representing the periodic direction can also be put on the cholesteric liquid crystal layer in addition to the support and the temporary support.

In the optical element (the optical element according to Example 1) shown in FIGS. 1 and 2, the incidence portion includes six incidence elements (six layers), and the emission portion includes eight emission elements (eight layers). The angles between the diffraction elements (the incidence elements and the emission elements) shown in Table 1 are based on the directions of 0° and 90° shown in FIG. 2.

As the light guide plate, a glass plate (refractive index: 1.70, thickness: 0.50 mm) was used.

Table 3 shows the diffraction period of the diffraction element used in the prepared optical elements, the diffraction period (normalized with Λ1) of each of the diffraction elements normalized with the diffraction element having the longest diffraction period, and the relationship between the periodic directions of the diffraction elements. The diffraction periods of the diffraction elements used in each of the optical elements were Λ1, Λ2, and Λ3 in order from the longest.

Further, as a display of AR glasses, a DLP type projector was used, and AR glasses shown in FIGS. 1 and 2 were prepared.

[Example 2], [Example 3], and [Comparative Example 1] to [Comparative Example 3]

Optical elements were prepared using the same method as that of Example 1, except that the kind and the number of the liquid crystal diffraction elements bonded to the light guide plate and the periodic direction in the cholesteric liquid crystal layer of the liquid crystal diffraction element were changed in various ways as shown in Tables 2 and 3. Using the optical elements, AR glasses were prepared.

Figure 16:
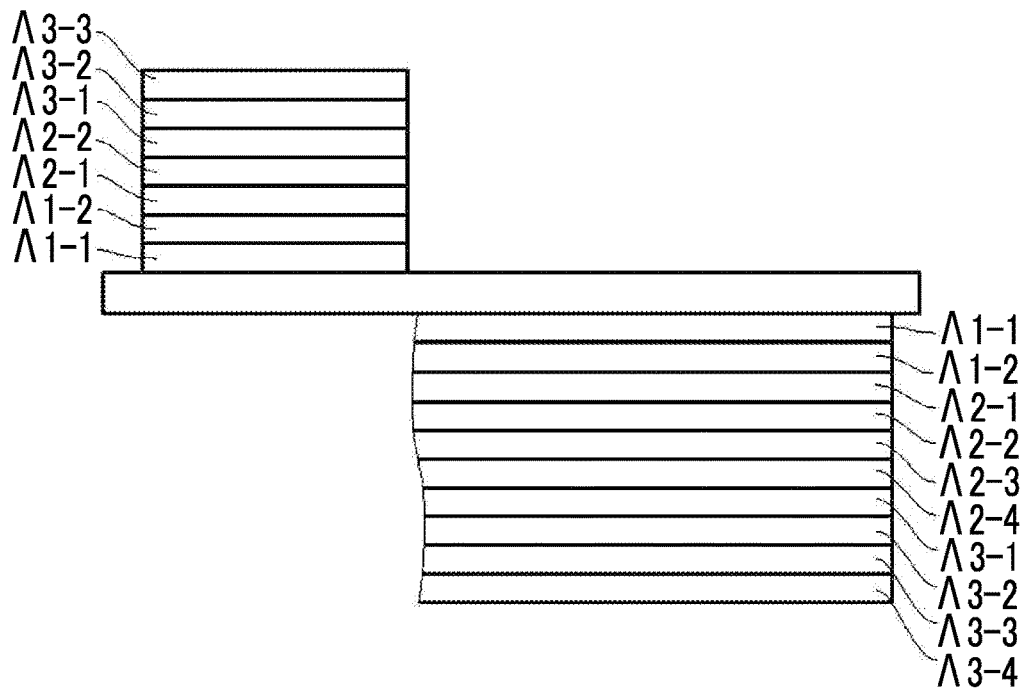
FIG. 16 is a conceptual diagram showing Example 2.
Figure 17:
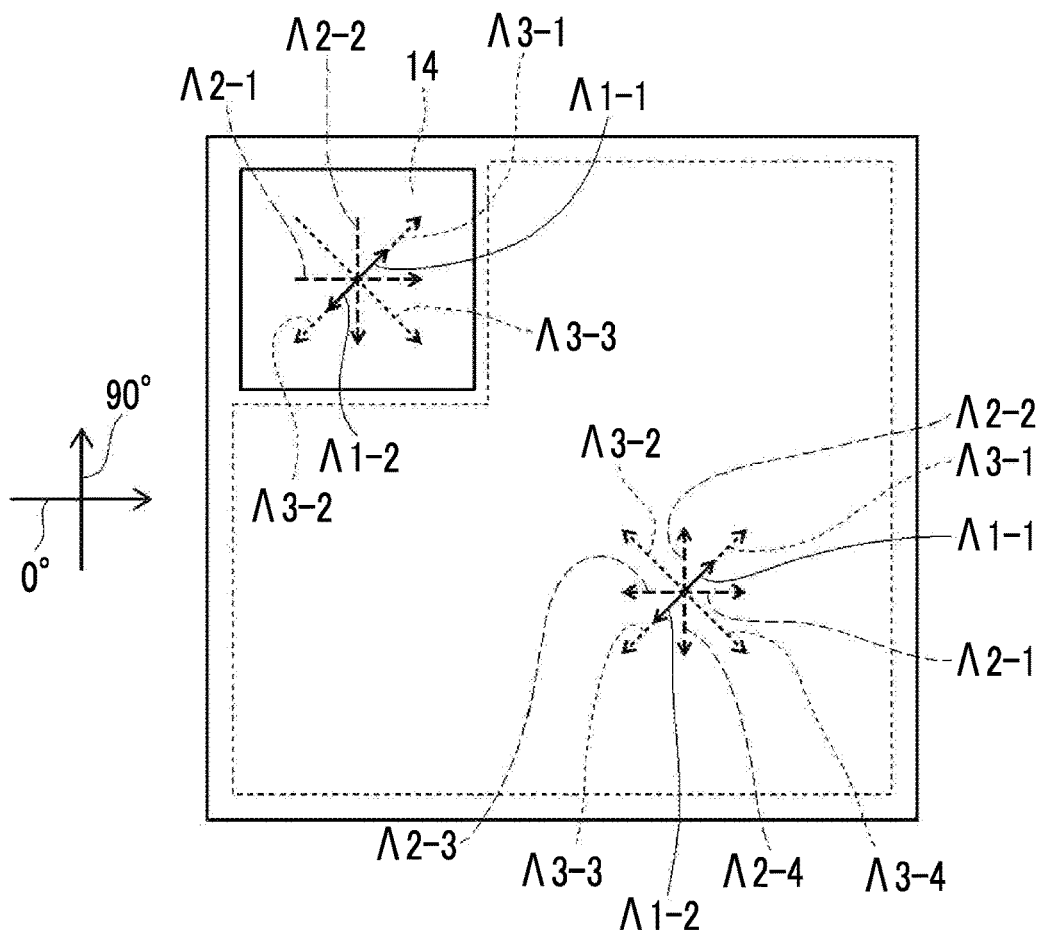
FIG. 17 is a conceptual diagram showing Example 2.

FIGS. 16 and 17 conceptually show the configuration of Example 2 by simulating FIGS. 1 and 2.

TABLE 2

| | | | Example 1 | Example 2 | Example 3 | Comparative Example 1 | Comparative Example 2 | Comparative Example 3 |
|---|---|---|---|---|---|---|---|---|
| Incidence Portion | First Layer | Diffraction Period [nm] | 580 | 585 | 590 | 480 | 580 | 580 |
| | | Periodic Direction [deg.] | 45 | 45 | 45 | 45 | 45 | 45 |
| | | Liquid Diffraction Element | #1 | #7 | #13 | #19 | #1 | #1 |
| | Second Layer | Diffraction Period [nm] | 580 | 585 | 590 | 480 | 580 | 580 |
| | | Periodic Direction [deg.] | 225 | 225 | 225 | 225 | 225 | 225 |
| | | Liquid Diffraction Element | #1 | #7 | #13 | #19 | #1 | #1 |
| | Third Layer | Diffraction Period [nm] | 410 | 414 | 590 | 480 | 410 | 410 |
| | | Periodic Direction [deg.] | 0 | 0 | 315 | 315 | 0 | 0 |
| | | Liquid Diffraction Element | #2 | #8 | #13 | #19 | #2 | #2 |
| | Fourth Layer | Diffraction Period [nm] | 410 | 414 | 417 | 339 | 410 | 410 |
| | | Periodic Direction [deg.] | 270 | 270 | 0 | 0 | 270 | 270 |
| | | Liquid Diffraction Element | #2 | #8 | #14 | #20 | #2 | #2 |
| | Fifth Layer | Diffraction Period [nm] | 290 | 293 | 417 | 339 | 300 | 290 |
| | | Periodic Direction [deg.] | 45 | 45 | 270 | 270 | 45 | 45 |
| | | Liquid Diffraction Element | #3 | #9 | #14 | #20 | #23 | #3 |
| | Sixth Layer | Diffraction Period [nm] | 290 | 293 | 295 | — | 300 | 290 |
| | | Periodic Direction [deg.] | 225 | 225 | 45 | — | 225 | 225 |
| | | Liquid Diffraction Element | #3 | #9 | #15 | — | #23 | #3 |
| | Seventh Layer | Diffraction Period [nm] | — | 293 | 295 | — | — | — |
| | | Periodic Direction [deg.] | — | 315 | 225 | — | — | — |
| | | Liquid Diffraction Element | — | #9 | #15 | — | — | — |
| | Eighth Layer | Diffraction Period [nm] | — | — | 295 | — | — | — |
| | | Periodic Direction [deg.] | — | — | 315 | — | — | — |
| | | Liquid Diffraction Element | — | — | #15 | — | — | — |
| Emission Portion | First Layer | Diffraction Period [nm] | 580 | 585 | 590 | 480 | 580 | 580 |
| | | Periodic Direction [deg.] | 45 | 45 | 45 | 45 | 45 | 45 |
| | | Liquid Diffraction Element | #4 | #10 | #16 | #21 | #4 | #4 |
| | Second Layer | Diffraction Period [nm] | 580 | 585 | 590 | 480 | 580 | 580 |
| | | Periodic Direction [deg.] | 225 | 225 | 135 | 135 | 225 | 225 |
| | | Liquid Diffraction Element | #4 | #10 | #16 | #21 | #4 | #4 |
| | Third Layer | Diffraction Period [nm] | 410 | 414 | 590 | 480 | 410 | 410 |
| | | Periodic Direction [deg.] | 0 | 0 | 225 | 225 | 0 | 0 |
| | | Liquid Diffraction Element | #5 | #11 | #16 | #21 | #5 | #5 |
| | Fourth Layer | Diffraction Period [nm] | 410 | 414 | 590 | 480 | 410 | 410 |
| | | Periodic Direction [deg.] | 90 | 90 | 315 | 315 | 90 | 90 |
| | | Liquid Diffraction Element | #5 | #11 | #16 | #21 | #5 | #5 |
| | Fifth Layer | Diffraction Period [nm] | 410 | 414 | 417 | 339 | 410 | 410 |
| | | Periodic Direction [deg.] | 180 | 180 | 0 | 0 | 180 | 180 |
| | | Liquid Diffraction Element | #5 | #11 | #17 | #22 | #5 | #5 |
| | Sixth Layer | Diffraction Period [nm] | 410 | 414 | 417 | 339 | 410 | 410 |
| | | Periodic Direction [deg.] | 270 | 270 | 90 | 90 | 270 | 270 |
| | | Liquid Diffraction Element | #5 | #11 | #17 | #22 | #5 | #5 |
| | Seventh Layer | Diffraction Period [nm] | 290 | 293 | 417 | 339 | 300 | 290 |
| | | Periodic Direction [deg.] | 45 | 45 | 180 | 180 | 45 | 43 |
| | | Liquid Diffraction Element | #6 | #12 | #17 | #22 | #24 | #6 |
| | Eighth Layer | Diffraction Period [nm] | 290 | 293 | 417 | 339 | 300 | 290 |
| | | Periodic Direction [deg.] | 225 | 135 | 270 | 270 | 225 | 225 |
| | | Liquid Diffraction Element | #6 | #12 | #17 | #22 | #24 | #6 |
| | Ninth Layer | Diffraction Period [nm] | — | 293 | 295 | — | — | — |
| | | Periodic Direction [deg.] | — | 225 | 45 | — | — | — |
| | | Liquid Diffraction Element | — | #12 | #18 | — | — | — |
| | Tenth Layer | Diffraction Period [nm] | — | 293 | 295 | — | — | — |
| | | Periodic Direction [deg.] | — | 315 | 135 | — | — | — |
| | | Liquid Diffraction Element | — | #12 | #18 | — | — | — |
| | Eleventh Layer | Diffraction Period [nm] | — | — | 295 | — | — | — |
| | | Periodic Direction [deg.] | — | — | 225 | — | — | — |
| | | Liquid Diffraction Element | — | — | #18 | — | — | — |

TABLE 2-continued

|  |  | Example 1 | Example 2 | Example 3 | Comparative Example 1 | Comparative Example 2 | Comparative Example 3 |
|---|---|---|---|---|---|---|---|
| Twelfth Layer | Diffraction Period [nm] | — | — | 295 | — | — | — |
|  | Periodic Direction [deg.] | — | — | 315 | — | — | — |
|  | Liquid Diffraction Element | — | — | #18 | — | — | — |

[Evaluation]

Regarding the AR glasses, crosstalk and FOV were evaluated.

(Evaluation of Crosstalk)

The display of the prepared AR glasses was driven to display an image. The display image was a square pattern.

The crosstalk of the displayed image was evaluated based on the following standards.

A: the occurrence of crosstalk cannot be observed by visual inspection

B: the occurrence of crosstalk can be observed by visual inspection

The results are shown in Table 3.

(Evaluation of FOV)

Figure 18:
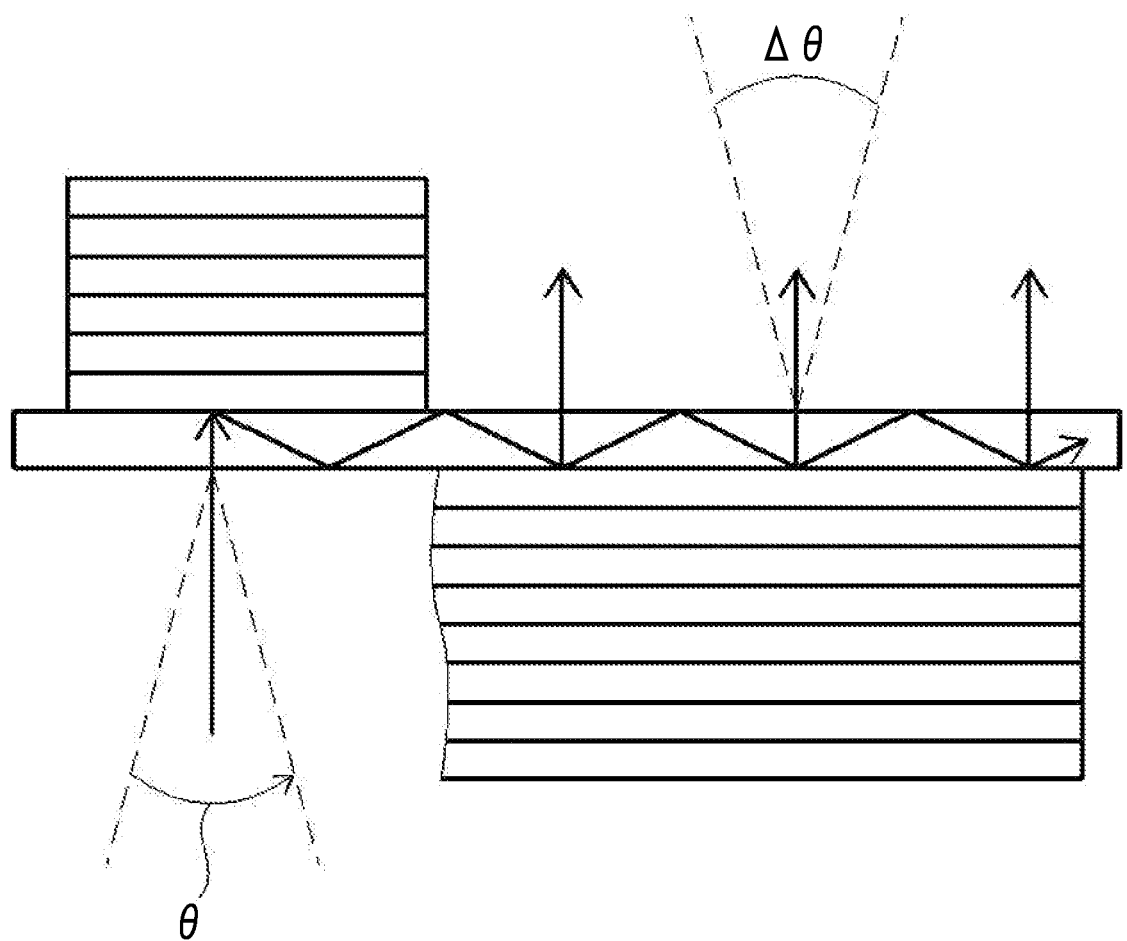
FIG. 18 is a conceptual diagram showing a method of measuring a FOV in Examples.

As conceptually shown in FIG. 18 simulating FIG. 1, Laser beams having a wavelength of 450 nm, a wavelength of 520 nm, and a wavelength of 635 nm were caused to be incident into the prepared optical element while changing the angle θ, an angle Δθ at which the laser beam was output was measured at an observation position by the user, and the Δθ was set as the FOV.

The FOV was evaluated using the laser beam having a wavelength where the output angle Δθ was the smallest.

The evaluation standards are as follows.

AA+: the FOV is 70° or more

AA: the FOV is 65° or more and less than 70°

A: the FOV is 50° or more and less than 65°

B: the FOV is less than 50°

The results are shown in Table 3.

portion includes three kinds of diffraction elements having different diffraction periods of Λ1, Λ2, and Λ3, a relationship of "Λ1:Λ2:Λ3=1:1:√2±0.015:1/2±0.015" is satisfied, an angle between the periodic directions of the diffraction element having the diffraction period Λ1 and the diffraction element having the diffraction period Λ2 and an angle between the periodic directions of the diffraction element having the diffraction period Λ2 and the diffraction element having the diffraction period Λ3 are 45°±0.5° or 135°±0.5°, and an angle between the diffraction elements having the diffraction period Λ2 of the incidence portion and the emission portion is any one of 00±0.5°, 90°±0.5°, 180°±0.5°, or 270°±0.5°. With this configuration, crosstalk can be prevented and a wide FOV can be obtained using one light guide plate.

In addition, as shown in Examples 2 and 3, a wider FOV can be obtained by increasing the number of the diffraction elements in the incidence portion and the emission portion.

On the other hand, in Comparative Example 1 where the incidence portion and the emission portion include only two kinds of diffraction elements having the diffraction periods of Λ1 and Λ2, a sufficient FOV cannot be obtained.

In addition, in Comparative Example 2 where the diffraction period of the diffraction period Λ3 normalized with the diffraction period Λ1 exceeds 1/2±0.15 and Comparative Example 3 where the angle between the periodic directions of the diffraction element having the diffraction period Λ2

TABLE 3

|  |  |  | Example 1 | Example 2 | Example 3 | Comparative Example 1 | Comparative Example 2 | Comparative Example 3 |
|---|---|---|---|---|---|---|---|---|
| Diffraction Period | Λ1 [nm] |  | 580 | 585 | 590 | 480 | 580 | 580 |
|  | Λ2 [nm] |  | 410 | 414 | 417 | 339 | 410 | 410 |
|  | Λ3 [nm] |  | 290 | 293 | 295 | — | 300 | 290 |
|  | Λ1 | Normalized with Λ1 | 1 | 1 | 1 | 1 | 1 | 1 |
|  | Λ2 |  | 1/√2 | 1/√2 | 1/√2 | 1/√2 | 1/√2 | 1/√2 |
|  | Λ3 |  | 1/2 | 1/2 | 1/2 | — | 0.52 | 1/2 |
| Relationship of Periodic Directions of Diffraction Elements | Angle between Periodic Directions of Λ1 and Λ2 [deg.] |  | 45 or 135 | 45 or 135 | 45 or 135 | 45 or 135 | 45 or 135 | 45 or 135 |
|  | Angle between Periodic Directions of Λ2 and Λ3 [deg.] |  | 45 or 135 | 45 or 135 | 45 or 135 | — | 45 or 135 | 43 or 47 or 133 or 137 |
|  | Relationship between Periodic Directions of Λ2 of Incidence Portion and Emission Portion [deg.] |  | 0 or 90 or 180 or 270 | 0 or 90 or 180 or 270 | 0 or 90 or 180 or 270 | 0 or 90 or 180 or 270 | 0 or 90 or 180 or 270 | 0 or 90 or 180 or 270 |
| Layer Number of Diffraction Elements | Incidence Portion | Λ1 | 2 layers | 2 layers | 3 layers | 3 layers | 2 layers | 2 layers |
|  |  | Λ2 | 2 layers | 2 layers | 2 layers | 2 layers | 2 layers | 2 layers |
|  |  | Λ3 | 2 layers | 3 layers | 3 layers | — | 2 layers | 2 layers |
|  | Emission Portion | Λ1 | 2 layers | 2 layers | 4 layers | 4 layers | 2 layers | 2 layers |
|  |  | Λ2 | 4 layers | 4 layers | 4 layers | 4 layers | 4 layers | 4 layers |
|  |  | Λ3 | 2 layers | 4 layers | 4layers | — | 2 layers | 2 layers |
| Evaluation | Crosstalk |  | A | A | A | A | B | B |
|  | FOV |  | A | AA | AA+ | B | A | A |

As shown in Table 3, in the optical element and the AR glasses (image display apparatus) according to the embodiment of the present invention, the incidence portion includes 6 or more layers, the emission portion includes 8 or more layers, each of the incidence portion and the emission and the diffraction element having the diffraction period Λ3 exceeds the range of 450±0.5° and 1350±0.5°, crosstalk occurs, and an appropriate image cannot be displayed.

As can be seen from the above results, the effects of the present invention are obvious.

The present invention is suitably applicable to an image display apparatus such as AR glasses.

EXPLANATION OF REFERENCES

10: image display apparatus
12: optical element
14: display
18: light guide plate
20: incidence portion
24: emission portion
26Λ1-1, 26Λ1-2, 28Λ2-1, 28Λ2-2, 30Λ3-1, 30Λ3-2: incidence element
34Λ1-1, 34Λ1-2, 36Λ2-1, 36Λ2-2, 36Λ2-3, 36Λ2-4, 38Λ3-1, 38Λ3-2: emission element
40: liquid crystal compound
40A: optical axis
42: bright portion
44: dark portion
50: support
52: alignment film
54: (cholesteric) liquid crystal layer
56: liquid crystal layer
60: exposure device
62: laser
64: light source
65: λ/2 plate
68: polarization beam splitter
70A, 70B: mirror
72A, 72B: λ/4 plate
$R_R$: right circularly polarized light of red light
M: laser light
MA, MB: beam
$P_O$: linearly polarized light
$P_R$: right circularly polarized light
$P_L$: left circularly polarized light
$L_1$, $L_4$: incidence light
$L_2$, $L_5$: transmitted light
U: user
D: arrangement axis
Λ: diffraction period
P: helical pitch

What is claimed is:

1. An optical element comprising:
a light guide plate;
an incidence portion that causes light to be incident into the light guide plate; and
an emission portion that emits light from the light guide plate,
wherein the incidence portion includes 6 or more diffraction elements,
the emission portion includes 8 or more diffraction elements,
each of the incidence portion and the emission portion includes, as the diffraction elements, a Λ1 diffraction element where a period in a diffraction structure is Λ1, a Λ2 diffraction element where a period in a diffraction structure is Λ2, and a Λ3 diffraction element where a period in a diffraction structure is Λ3,
the period Λ1, the period Λ2, and the period Λ3 satisfy a relationship of "Λ1:Λ2:Λ3=1:1/√2±0.015:1/2±0.015",
an angle between a periodic direction of the diffraction structure of the Λ1 diffraction element and a periodic direction of the diffraction structure of the Λ2 diffraction element and an angle between a periodic direction of the diffraction structure of the Λ2 diffraction element and a periodic direction of the diffraction structure of the Λ3 diffraction element are 45°±0.5° or 135°±0.5°, and
an angle between the periodic direction in the diffraction structure of the Λ2 diffraction element provided in the incidence portion and the periodic direction in the diffraction structure of the Λ2 diffraction element provided in the emission portion is any one of 0°±0.5°, 90°±0.5°, 180°±0.5°, or 270°±0.5°.

2. The optical element according to claim 1,
wherein the diffraction element includes a liquid crystal diffraction layer that is formed of a composition including a liquid crystal compound,
the liquid crystal diffraction layer has a liquid crystal alignment pattern where a direction in which a direction of an optical axis derived from the liquid crystal compound changes while continuously rotating is in at least one in-plane direction,
in the liquid crystal alignment pattern, the direction in which the direction of the optical axis derived from the liquid crystal compound changes while continuously rotating in the at least one in-plane direction is the periodic direction in the diffraction structure of the diffraction element, and
a length over which the direction of the optical axis derived from the liquid crystal compound rotates by 180° in the periodic direction of the diffraction structure is the period in the diffraction structure of the diffraction element.

3. The optical element according to claim 2,
wherein the liquid crystal diffraction layer is a cholesteric liquid crystal layer obtained by immobilizing a cholesteric liquid crystalline phase.

4. The optical element according to claim 1,
wherein the optical element includes a plurality of the Λ1 diffraction elements, and
the incidence portion and the emission portion include a combination of the Λ1 diffraction elements where an angle between the periodic directions in the diffraction structures is 180°±0.5°.

5. The optical element according to claim 1,
wherein the incidence portion and the emission portion include a plurality of the Λ3 diffraction elements, and
the incidence portion and the emission portion include a combination of the Λ3 diffraction elements where an angle between the periodic directions in the diffraction structures is 180°±0.5°.

6. The optical element according to claim 1,
wherein the incidence portion and the emission portion include a plurality of the Λ2 diffraction elements, and
the incidence portion and the emission portion include a combination of the Λ2 diffraction elements where an angle between the periodic directions in the diffraction structures is 90°±0.5°.

7. The optical element according to claim 6,
wherein in a case where the periodic direction in the diffraction structure of one of the Λ2 diffraction elements is 0°,
the emission portion includes, in addition to the Λ2 diffraction element where the periodic direction in the diffraction structure is 0°, the Λ2 diffraction element where the periodic direction in the diffraction structure is 90°±0.5°, the Λ2 diffraction element where the periodic direction in the diffraction structure is 180°±0.5°, and the Λ2 diffraction element where the periodic direction in the diffraction structure is 270°±0.5°.

8. An image display apparatus comprising:
the optical element according to claim 1; and
a display element that emits an image to the incidence portion of the optical element.

* * * * *